United States Patent
Elliott et al.

(10) Patent No.: US 12,315,390 B2
(45) Date of Patent: May 27, 2025

(54) DATA PROCESSING SYSTEM FOR DATA RETRIEVAL FROM DATA STORAGE

(71) Applicant: CAMBIUM INTERMEDIATE HOLDINGS, LLC, Dallas, TX (US)

(72) Inventors: Larry Christopher Elliott, Tucson, AZ (US); Jamie Hans Larsen, Tucson, AZ (US); Anthony Aaron Williamson, Tucson, AZ (US); Douglas Edward Andrews, Tucson, AZ (US); Marsha Lee Ganz, Tucson, AZ (US); Barbara Anne Kruger, Tucson, AZ (US)

(73) Assignee: CAMBIUM INTERMEDIATE HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/375,111

(22) Filed: Sep. 29, 2023

(65) Prior Publication Data

US 2025/0111795 A1    Apr. 3, 2025

(51) Int. Cl.
| | |
|---|---|
| *G09B 5/02* | (2006.01) |
| *G06F 3/0484* | (2022.01) |
| *G09B 5/00* | (2006.01) |
| *G06F 40/10* | (2020.01) |

(Continued)

(52) U.S. Cl.
CPC ............ *G09B 5/02* (2013.01); *G06F 3/0484* (2013.01); *G09B 5/00* (2013.01); *G06F 40/10* (2020.01); *G09B 7/00* (2013.01); *G09B 7/02* (2013.01)

(58) Field of Classification Search
CPC ... G09B 5/02; G09B 7/00; G09B 5/00; G09B 7/02; G06F 3/0484; G06F 40/10
See application file for complete search history.

(56) References Cited

U.S. PATENT DOCUMENTS

| | | | |
|---|---|---|---|
| 10,395,173 B1 * | 8/2019 | Heidenreich | G06N 5/02 |
| 2003/0152902 A1 * | 8/2003 | Altenhofen | G09B 7/00 |
| | | | 434/350 |

(Continued)

*Primary Examiner* — Jack Yip
(74) *Attorney, Agent, or Firm* — Fish & Richardson P.C.

(57) ABSTRACT

Methods, systems, and apparatus, including computer programs encoded on a computer storage medium, for configuring, accessing, identifying, and delivering a plurality of data structures that include interfaces configured to guide users through an elementary school writing curriculum based on interactions of users with one or more of the interfaces. In one aspect, a system comprises a data processing system for reading a plurality of data structures representing educational modules and ordering data specifying an order in which the educational modules and their corresponding lessons are rendered from a hardware storage device. In another aspect, the system generates a computer program based on the read data structures for causing rendering of a graphical user interface including a visual representation of a lesson of an educational module that specifies which one or more visual representations to render and maintains a state of the computer program for specifying which educational module is currently being rendered and which lesson of that educational module is currently being rendered, the updating of which causes accessing, identifying, and delivering of a plurality of data structures that include interfaces for transitioning to another lesson of the module or another module.

20 Claims, 13 Drawing Sheets

(51) Int. Cl.
*G09B 7/00* (2006.01)
*G09B 7/02* (2006.01)

(56) References Cited

U.S. PATENT DOCUMENTS

| | | | | |
|---|---|---|---|---|
| 2003/0163784 A1* | 8/2003 | Daniel | G06F 40/10 | 715/201 |
| 2005/0026131 A1* | 2/2005 | Elzinga | G09B 5/00 | 434/365 |
| 2005/0188311 A1* | 8/2005 | Diesel | G09B 7/00 | 715/201 |
| 2006/0242004 A1* | 10/2006 | Yaskin | G06Q 30/0203 | 705/7.38 |
| 2007/0209004 A1* | 9/2007 | Layard | G09B 5/00 | 707/E17.116 |
| 2008/0270166 A1* | 10/2008 | Morin | G06Q 50/20 | 705/326 |
| 2009/0311658 A1* | 12/2009 | Polivka | G09B 5/00 | 434/350 |
| 2011/0039242 A1* | 2/2011 | Packard | G09B 5/00 | 434/362 |
| 2011/0200979 A1* | 8/2011 | Benson | G09B 7/00 | 434/350 |
| 2012/0021395 A1* | 1/2012 | Mandolini | G09B 7/06 | 434/263 |
| 2014/0122595 A1* | 5/2014 | Murdoch | H04L 41/509 | 434/350 |
| 2014/0287397 A1* | 9/2014 | Chong | G09B 5/12 | 434/350 |
| 2017/0316091 A1* | 11/2017 | Edge | G06F 40/10 | |
| 2019/0019428 A1* | 1/2019 | Pulido | G09B 7/00 | |
| 2019/0088153 A1* | 3/2019 | Bader-Natal | H04N 7/147 | |
| 2019/0297155 A1* | 9/2019 | Baumgarten | G09B 5/14 | |
| 2020/0388183 A1* | 12/2020 | Bramlet | G09B 7/04 | |
| 2021/0142691 A1* | 5/2021 | Ferguson | G06Q 10/101 | |
| 2022/0130268 A1* | 4/2022 | Alioto | G09B 7/00 | |

* cited by examiner

Panel A 720

- Revising Checklist 1 610
- Revising Checklist 2 620
- ∨ Editing Checklist 710

Capitalization 712

My sentences begin with capital letters. 714(a)   714(b)

Proper nouns are capitalized. 716(a)   716(b)

I checked that names with titles are capitalized. 718(a)   718(b)

I checked that days of the week are capitalized.

I checked that all main words in titles of books are

🗎 Reference Text
📚 Graphic Organizer
👆 Checklist

Selectable Portion 410

Panel B 730

Use the editing checklist to guide your edits.

↺ ↻ | A ∨ | ✎ ∨ | B U I S ...

Dear Principal Westbook,

I would like to share my thoughts about the length of the third grade lunch period. In my opinion, the lunch period should be longer. There are two reasons why I think this. First, there is more to the lunch period than just eating. For example, students have to wait in line, get their food, wash their hands, and find a seat. Sience these things take time, students only have fifteen minutes left to eat. Second, healthy foods like gruits and vegetables take a long time to eat. When the lunch perios is short, students choose a quick, unhealthy snack instead of a healthy foods that take longer to eat. As you cah see, the lunch period needs to be exteneded.

Sincerely,
Ms Bitzer (Back ←)   (Done ✓)  740

DATA PROCESSING SYSTEM FOR DATA RETRIEVAL FROM DATA STORAGE

TECHNICAL FIELD

This disclosure relates to data processing systems for data search and retrieval augmentation and enhanced data storage. Specifically, this disclosure relates to retrieving data from multiple sources for juxtaposition in a visualization.

BACKGROUND

User interfaces (UI) can be used to display and interact with data maintained by website infrastructure, including servers, networks, and data storage devices. In particular, website infrastructure can support the uploading, maintaining, and editing of content on a website using a UI configured with a data processing system that can store and access the appropriate data.

SUMMARY

A data processing system is configured for accessing a plurality of data structures that are stored in a data store. The plurality of data structures augment the data store to enable the data store to relate different items of data to one another in the data store. The data items include a plurality of application interfaces that are configured to be presented to users in a particular order and in a particular arrangement for educational purposes. Specifically, the data processing system is configured to render the plurality of application interfaces to guide users through an elementary school writing curriculum that consists of units that target user, e.g., student, achievement of elementary-level writing standards. The data processing system identifies and delivers accessed resources in the desired order and format for each module of the units of the curriculum based on interactions of users with one or more of the interfaces. In some implementations, the data processing system transmits the accessed items of data of the application to a user device for display.

A module defines a goal of the unit within the elementary school writing curriculum. Each module can include one or more lessons, which define sub-goals of the module. Each lesson can correspond with a writing stage in the stages of writing: planning, drafting, revision, and final editing. In particular, the application promotes independent-practice learning by providing an individual portal for each user to complete his or her lesson assignment. The individual portal allows users to interact with a variety of writing resources independently to complete the lesson. The data processing system guides the user to complete the lessons in a sequence to complete a module by accessing the plurality of interface visualizations that correspond with the writing resources and juxtaposing them with a user input interface.

The application provides a split-screen user interface (UI) presentation for lessons. The configuration of lessons is ordered to improve learning for elementary school users. The data processing system configures the application to display a split-screen UI that provides a side-by-side visualization with a draft panel on a first panel of the UI and a configurable support materials panel on a second panel that juxtaposes the first panel and displays the plurality of writing resource interface visualizations. In some examples, the draft panel is an input portion for receiving input text associated with an assignment and the configurable support materials panel includes a selectable portion for displaying different interface visualizations. This is in contrast to a display of a variety of writing resources in separate views on the portal, which can confuse elementary age users.

The selectable portion of the configurable support materials panel can include one or more buttons to control the configurable support material view. In particular, the data structures of the application enable the data processing system to maintain, identify, and access content of the configurable support material visualizations for each lesson and control generation of visualizations that include the plurality of interfaces for guided interaction with the lesson. The data processing system accesses the data items that are presented in the juxtaposed panels based on one or more primary-foreign key relationships of the data store that relate content of the support materials panel to the draft panel. The one or more primary-foreign key relationships of the data store enable the data processing system to identify the related resources for including in each stage of the guided learning, access those related resources, and present the related resources to the user based on interactions of the user with the resources.

The data processing system described herein provides the following advantages.

The data processing system provides data content accessed from the data storage in juxtaposed panels of a UI in a split-screen view. The juxtaposition of the displayed interactive panels guide user interactions through each lesson, providing educational content in a particular order in response to particular interactions. In an example lesson, an application administrator (e.g., a teacher) can first mirror the assignment by demonstrating how the writing resources of the selectable portion of the configurable support materials panel provided by the data processing system for the specific lesson align with completing the lesson all in the same view. Each user can access a respective independent practice account and complete the configured assignment with the exact same visualization interfaces including the writing resources shown by the administrator. In other words, the administrator can access the writing resources in a particular order and the user can mimic the particular order of accessing in order to complete the lesson.

Additionally, the data processing system identifies specific, correct resources and configures the options available on the configurable support material panel to focus users on certain key aspects of the lesson. In particular, the configurable support material options available to users are specifically maintained for each lesson, such that users are introduced to the correct resources for a specific writing stage represented by the lesson. For example, the data processing system identifies the configurable support material content of the lesson and generates a computer program that specifies which options (corresponding with respective visualizations in the configurable support material panel) to include such that users are guided through the module in a logical manner with respect to the stages of writing.

The data processing system configures the selectable portion of the configurable support materials panel to include radio buttons with illustrations corresponding to specific support materials, such as a writer's notebook for jotting down notes and capturing ideas, reference texts when applicable to the assignment, a graphic organizer to organize thoughts in the applicable assignment framework before writing, an interactive revision checklist for intermediate lesson self-reflection or self-evaluation, an editing checklist for polishing work before a final submission, a feedback portion, and a writing library for viewing submitted lesson work. The data processing system tailors the options available to the users in each lesson in order to ensure users are not overwhelmed with too many options all at once, some of which are not relevant to their current stage of writing. Furthermore, revealing options as the module progresses allows users to see the editing process unfold before them as the users complete the stages of writing.

As an example, a unit on opinion writing may include a module on writing a persuasive letter that includes lessons such as planning supporting details, drafting topic sentences, revising word choices, and revising leading and concluding paragraph sentences, before a final editing stage. In this case, the data processing system can configure the selectable portion of the configurable support materials panel for the drafting topic sentences lesson to appropriately include the writer's notebook, reference text, and graphic organizer option radio buttons such that users can access the corresponding resource interface visualizations, but no revision or editing checklist buttons, since users are not yet on that stage.

As another example, for the next lesson on revising the word choice, the data processing system can configure the selectable portion of the configurable support materials panel appropriately for revising the word choice assignment to include the writer's notebook, reference text, graphic organizer, and revision checklist option radio buttons such that users can access the corresponding resource interface visualizations. In the case where the administrator provides feedback for the work submitted after the revisions of the particular lesson, the next lesson can include a feedback button. By displaying the feedback in the same side-by-side view with their work, users are less likely to be distracted by switching between a feedback section and the writing the feedback pertains to.

These and other aspects, features, and various combinations may be expressed as methods, apparatus, systems, means for performing functions, program products, etc.

DESCRIPTION OF DRAWINGS

Other features and advantages will be apparent from the description and the claims.

FIG. 2 is a visualization of an example draft panel input portion.

FIG. 6 is a visualization of an example revision checklist of the selectable portion of the configurable support materials panel.

FIG. 7 is visualization of an example final editing checklist of the selectable portion of the configurable support materials panel.

DETAILED DESCRIPTION

Figure 1A:
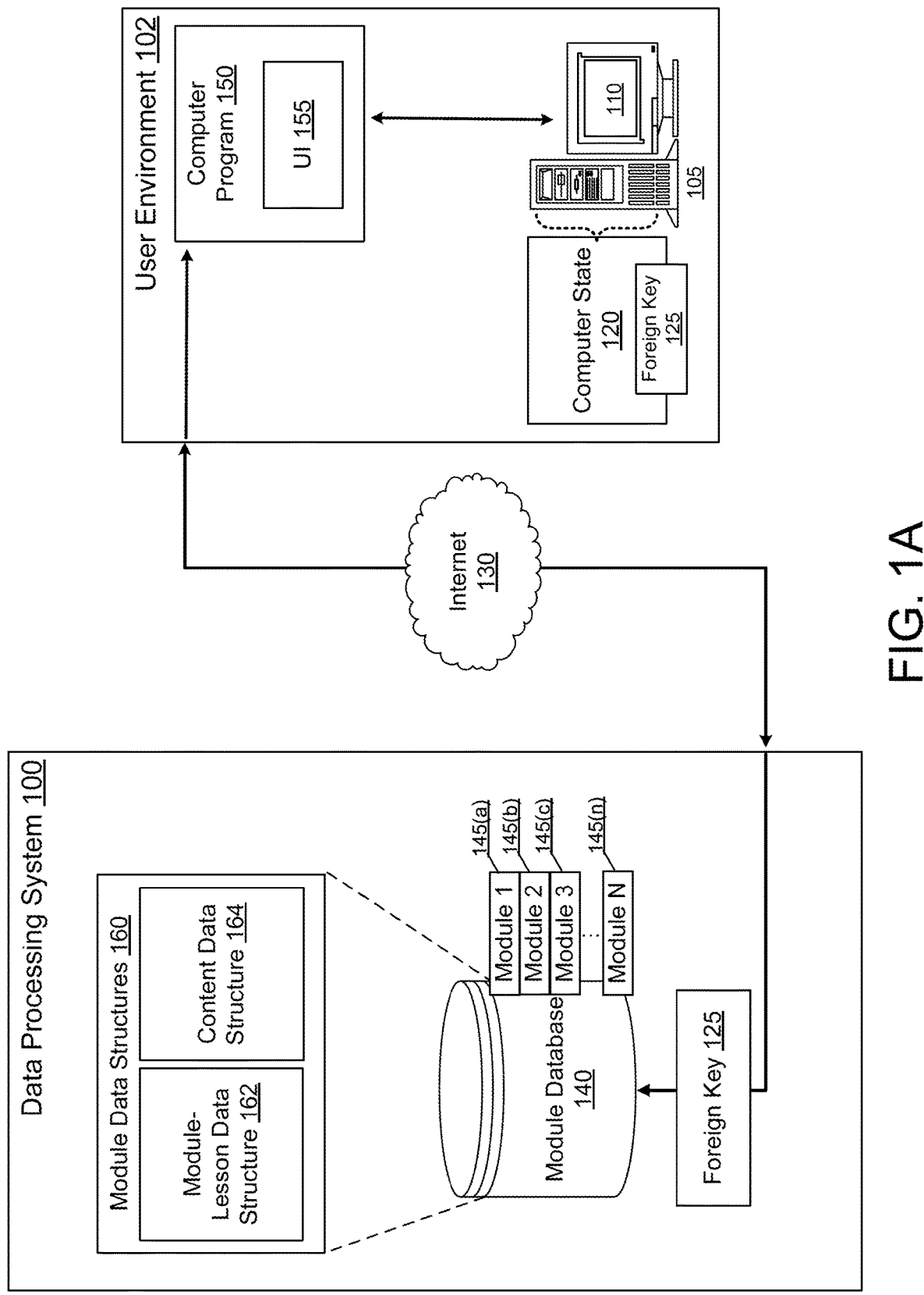
FIG. 1A is a system diagram of an example data processing system for satisfying a request for a lesson of the iterative independent-practice writing application.

Referring to FIG. 1A, an example data processing system 100 identifies and accesses relevant educational content from a database to generate a computer program that can be rendered on a computer display within a user environment 102. In particular, a computing device 105 presents on a display 110 a user interface (UI) 155 that allows a user to interact with a provided data source. In this case, the data source is a computer program 150 generated by the data processing system 100 to specify the rendering of a UI 155 of a learning management application that guides elementary users through the stages of writing in a unified module that includes planning, drafting, revision, and final editing lessons.

The data processing system 100 can configure the UI 155 of the application to present a sequence of interactive interfaces that each include a drafting panel and a configurable support materials panel that are juxtaposed with one another. The sequence of interactive interfaces guides users to interact with a variety of writing resources from a plurality of different sources. A user can interact with the sequence of interfaces and the provided writing resources to complete each lesson. The data processing system 100 configures the UI 155 to display specific writing resource visualizations to the user depending on which lesson the user is at within the module. The data processing system generates the computer program 150 that specifies the underlying resources that relate to that specific lesson and the corresponding UI 155 for accessing the appropriate writing resources. The relationships are each specified by primary key-foreign key pairs, as subsequently described.

The data processing system 100 configures the UI 155 to include radio buttons with illustrations corresponding to specific support material interface visualizations, such as a writer's notebook for jotting down notes and capturing ideas, reference texts when applicable to the assignment, a graphic organizer to organize thoughts in the applicable assignment framework before writing, an interactive revision checklist for self-reflection or self-evaluation before submitting intermediate assignments to the administrator, an editing checklist for polishing work before a final submission, a feedback portion, and a writing library for viewing submitted lesson work. Example visualizations of a writer's notebook, reference text, graphic organizer, interactive revision checklist, final editing checklist, feedback, and writing library visualization will be covered in FIGS. 2-9. Selecting each respective button can cause the computer program 150 to access and render the appropriate resource visualization included by the data processing system 100.

The data processing system 100 can ensure the computer program 150 includes instructions to render the correct resource visualizations through the maintenance of a computer state 120. In particular, the data processing system 100 can specify the state of the computer program 120 by tracking which education module and lesson the computer system 100 is currently rendering. The data processing system tracks the state 120 and relates the state 120 to a foreign key value 125 that is maintained in a hardware storage device within the device 105.

Generally, the foreign key value of the module 162 points to a primary key in the data structure 164 of the module data structures 160. The primary key for each of data structures 162, 164 includes a set of unique values that enable cross-referencing of content from each of the data structures 162, 164. Each row of the foreign key column of data structure 162 includes a value corresponds to a primary key value of data structure 164.

The data structures 162, 164 have values of the primary and foreign keys that are ordered to ensure that the desired sequence of interfaces is presented to users with the appropriate juxtaposed panels. In the case that a user is accessing the same lesson and module of the computer program 150 currently being executed by the system 100, the foreign key 125 does not need to be updated by the system 100.

In the case that a user is ready to advance lessons or switch modules, the system 100 can update the computer state 120 by updating the foreign key 125. The updating of the foreign key 125 can then trigger the system 100 to generate a new computer program 150 to ensure the appropriate writing resources are rendered for the specific module and lesson. More specifically, the data processing system 100 can use the foreign key 125 value to access the appropriate resources for rendering with the computer program 150 through a primary-foreign key relationship.

In particular, the computer program 150 can be configured to read from a hardware storage device that specifies an order in which the educational modules are rendered and an order in which lessons are rendered for the educational module, and based on the read data structures and the ordering data, generate a computer program 150 for causing rendering of a graphical user interface 155 including a visual representation of the lesson of an educational module. As an example, the foreign key 125 of the computer state 120 can be associated with another key, e.g. a primary key, in the hardware storage device. In some cases, the hardware storage device is local to the computer device 105. In other cases, the hardware storage device is not local to the computer device 105 but can be accessed through the internet 130.

In some examples, the hardware storage device maintains multiple module databases, each pertaining to a different writing unit. Each module database 140 can include a schema that maintains one or more data structures for each module of the lesson: 145(*a*), 145(*b*), 145(*c*), 145(*n*).

In the example depicted, the computer device 105 accesses the hardware storage device that maintains a plurality of data structures representing educational modules 145(*a*), 145(*b*), 145(*c*), etc. in a module database 140 using the internet 130. In this case, the module data structures 160 include a module-lesson data structure 162 and a content data structure 164. Each data structure can include primary keys and foreign keys for accessing other data structures representing lesson content of an educational module. The system 100 can use the key relationships defined by the module data structures 160 to access and locate the content for the specific module lesson. An example for how the data processing system 100 uses primary-foreign key matching to identify the appropriate content for the UI 155 of a specific lesson will be described in more detail with respect to FIG. 1B.

Based on the one or more appropriate primary-foreign key associations, the data processing system 100 can access the appropriate resource content from the module data structures 160. The system 100 can then generate a new computer program 150 for rendering the appropriate UI 155 for the specific module-lesson. In this case, the appropriate UI 155 can includes a side-by-side visualization with a draft panel and a configurable support materials panel that includes one or more buttons to control the visualization displayed with the configurable support material panel. The data processing system 100 can configure the UI to include different visual representations for each of the writing resources associated with the lesson as specified by the module data structures 160 within the configurable support materials panel. In particular, the data processing system can configure the computer program 150 for rendering the appropriate lesson UI 155 to render each of the writing resources associated with the lesson using one or more buttons in the configurable support materials panel. More specifically, the UI 155 can include buttons that control access to each of the writing resources associated with the lesson.

As an example, a unit on writing a fictional story can include lessons on generating ideas, planning a fictional story, drafting the story, and revising the dialogue in the story. The lesson content for each of these lessons can be maintained in the module data structures 160. The first lesson of the module can be accessed using the one or more appropriate primary-foreign key relationships for the generating ideas lessons. In particular, the one or more appropriate primary-foreign key relationships can specify that the computer program for the particular lesson's UI configuration of the support materials panel include a button that provides access to the writer's notebook resource.

When the user has completed the lesson, the system can update computer state by updating the foreign key, thereby triggering the generation of a new computer program for the second lesson in the module on drafting the story. In this case, the one or more appropriate primary-foreign key relationships can specify that the computer program for the lesson include a UI that includes buttons that provide access to both the writer's notebook resource and the graphic organizer resource on the support materials panel.

Furthermore, for the lesson about revising the dialogue, the one or more appropriate primary-foreign key relationships can specify that the computer program for the lesson include a UI that provides access to both the writer's notebook resource, the graphic organizer resource, and a checklist including statements that relate to revising the dialogue of the story through the inclusion of a respective writer's notebook, graphic organizer, and checklist buttons that display the associated visualization on the support materials panel.

Figure 1B:
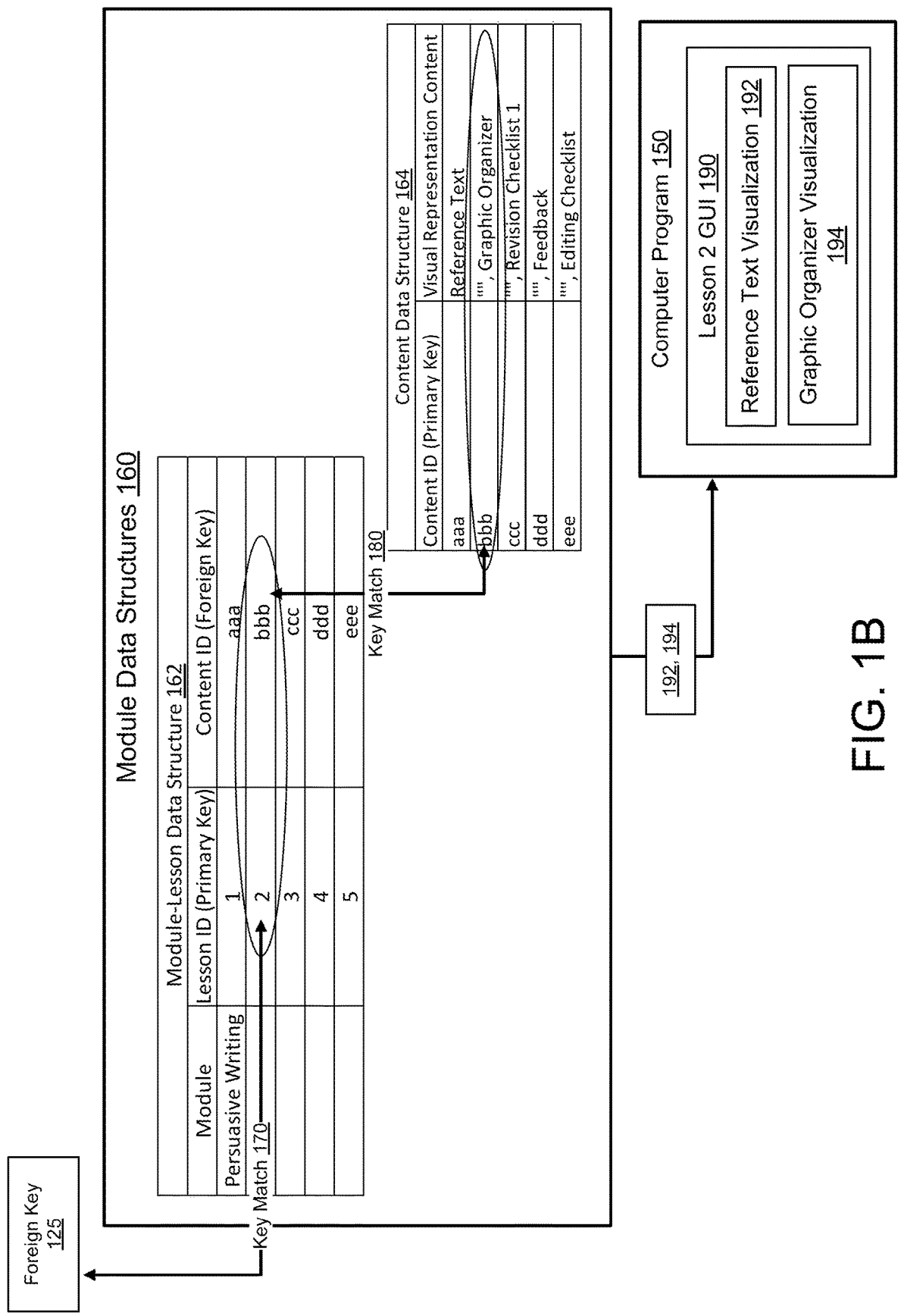
FIG. 1B demonstrates how the data processing system identifies the appropriate educational content for the lesson of the application.

FIG. 1B demonstrates how the data processing system identifies the appropriate educational content for the lesson of the application by associating the foreign key 125 with its component primary key to locate and access the appropriate content for a specific lesson. More specifically, FIG. 1B depicts how the Lesson 2 UI 190 is configured to include a reference text visualization 192 and a graphic organizer visualization 194.

In this example, the module data structures 160 include a module-lesson data structure 162 that provides a mapping between a lesson ID and a content ID and a content data structure 164 that provides a mapping between a content ID and visual representation content. In this case, the module-lesson data structure and content data structure 162 and 164 are tables. In other cases, these data structures can be dictionaries, linked lists, or cyclic graphs.

In this example, the module-lesson data structure 162 includes information regarding the goal of the module, ordering data specifying an order in which lessons are rendered within the module, and the appropriate content ID for the lesson. The content data structure 164 includes the content ID and its associated visual representation. In this example, quotation marks " " indicate that the entries of previous rows are also included in the row, e.g. " ", Graphic Organizer indicates that the Reference Text visualization (from the row above) and the Graphic Organizer visualization are included in the row specifying the visual representation content of content ID bbb.

In particular, the module-lesson data structure 162 associates the foreign key 125 of the computer state 120, which defines a lesson ID, with the associated lesson ID in the table 162. The data processing system 100 can perform the key match 170 to identify the associated foreign key content ID that can be used to access the content of the lesson in the content data structure 164. In some cases, the one or more key matches that associate the primary key with resource content can be a one-to-one relationship that ensures uniqueness of resource content for each lesson.

In an example in which the appropriate module data structure is module 2 145(*b*) and the appropriate lesson is lesson 2, the system 100 can identify and read the data structure for module 2 145(*b*) using part of the foreign key. As an example, the first three digits of the foreign key can specify a module identifier that forms the first three digits of the primary key and can be used to identify the appropriate module data structure. The system 100 can then use the remaining digits to match the lesson ID (e.g., 2) with the content ID (e.g., bbb). Then, the data processing system 100 can perform key match 180 with the identified content ID (e.g., bbb) from the module-lesson data structure 162 to find the appropriate visual representation content as specified in the content data structure 164. More specifically, the data processing system can use the content ID to identify the visual representations to be included in the computer program UI 155 for that lesson. In this case, the key matches 170 and 180 result in the lesson ID 2 being mapped to content including a reference text 192 and graphic organizer visualization 194. The data processing system 100 thus populates computer program 150 with the reference text 192 and graphic organizer visualization 194 as part of the Lesson 2 UI 190.

Figure 2:
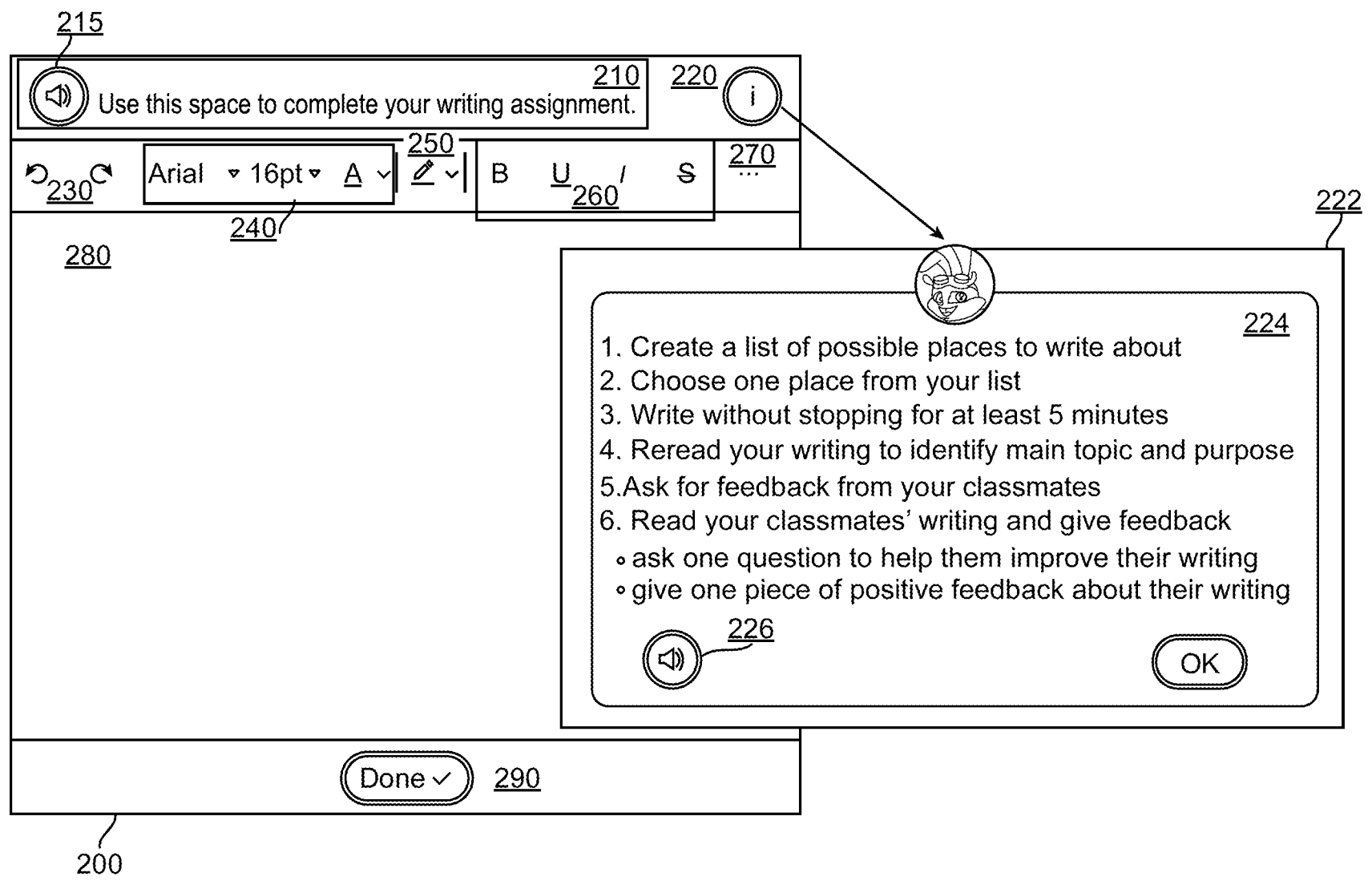

In some cases, the data processing system specifies that the UI draft panel visualization of the split-screen UI retains the same format across lessons. FIG. 2 is an example visualization of a draft panel that includes an input portion that allows a user to input and submit the text of a lesson assignment. The input portion 200 includes the lesson prompt 210, lesson instructions 220, and a text editor 280 with a number of text editor buttons that can be used to format the submitted text. In this example, the text editor buttons are student-friendly and larger than the text editor buttons would be in a standard text editor. The lesson prompt 210, lesson instructions, 220, and text editor buttons appear in a panel above the draft space of the text editor.

The lesson prompt 210 includes the general directions for the lesson. In this example, the lesson prompt 210 is displayed at the top of the panel above the draft space of the editor and specifies "Use this space to write your response,". As another example, the lesson prompt can outline the specific lesson objectives "Lesson 2 focuses on organizing your thoughts before writing a persuasive letter,". In some examples, the prompt 210 can also be accompanied by a button with a megaphone icon within the panel that can be selected for an audio version of the lesson prompt 215 to be read out loud. In particular, the audio prompt option can be provided to support users that are struggling with reading comprehension.

Additionally, more specific instructions can be viewed by clicking the information ("i") button 220, which can cause an information display window 222 to open and display more detailed instructions 224 for the lesson. As an example, these more detailed instructions 224 can include a list detailing concrete steps that a user can take to complete each aspect of the lesson. As another example, the more detailed instructions can include a flowchart that depicts each part of the lesson. In some cases, the more detailed directions can be written in a way that caters to a particular user, e.g., a student. Rather than overwhelming a user with a broad overall goal of the assignment, discretizing the lesson assignment into detailed instructions can provide users with tangible items to complete one by one in order to finish the lesson.

In the example shown in FIG. 2, rather than displaying "Write a paragraph about a place.", which is the overall goal of the lesson, the detailed instructions 224 displayed in the information display window 222 break down the aforementioned lesson goal into concrete steps including: creating a list of potential places to write about, choosing a place from the created list, and writing without stopping, before asking for feedback from others. In this example, the detailed instructions list 224 provides a discrete checklist for the user, thereby facilitating completion of the lesson. Additionally, since the specific instructions are viewed with a display window that overlays the split-screen UI, the specific instructions can also be hidden and opened again for reference throughout the completion of the lesson.

Additionally, in some examples, the more detailed instructions 224 can include an accompanying audio button 226. Similarly, to the prompt audio button 215, the detailed instruction audio button 226 includes a megaphone icon and can also be selected to read the more detailed instructions 222 out loud. In some cases, the detailed instruction audio button 226 option can be provided for users that are struggling with reading comprehension.

After the user has read and understood the lesson prompt 210 and the more detailed instructions 220, the user can begin to input their text in the draft space of the text editor portion 280 below the panel including the instructions and options. In particular, the text editor 280 offers a pair of edit undo/redo buttons 230 and drop-down menus with respect to text sizes, fonts, and color 240. In an example, the choices for each of the text size, font, and color can be limited to offer only a few choices to a user. For example, users can be limited between four fonts, such as Arial, Verdana, Times New Roman, and Georgia, and 10, 12, 14, 16, 20 point font sizes. In particular, the limited offerings can mitigate user distraction based on the aesthetic style of the writing as opposed to the content.

Additionally, the text editor 280 can include text formatting buttons. As an example, the text formatting buttons can include buttons for bolding, underlining, italicizing, and striking through text 260. In some examples, users may use these options for emphasis or to keep track of certain edits that the user makes to their work before submitting their assignment with the done button 290.

In some cases, the menu options offered will be greater than the space to display them. In this case, an additional overflow button 270 depicted by an ellipsis can be provided in the same space as the text formatting buttons. As an example, the overflow button 270 can include options for bulleting, numbering, paragraph formatting buttons, etc. In particular, paragraph formatting can include paragraph justification buttons to justify the inputted text left, right, and center. In some examples, the final lesson of a module can additionally include a spell check button for users to check their spelling before final submission.

Figure 3:
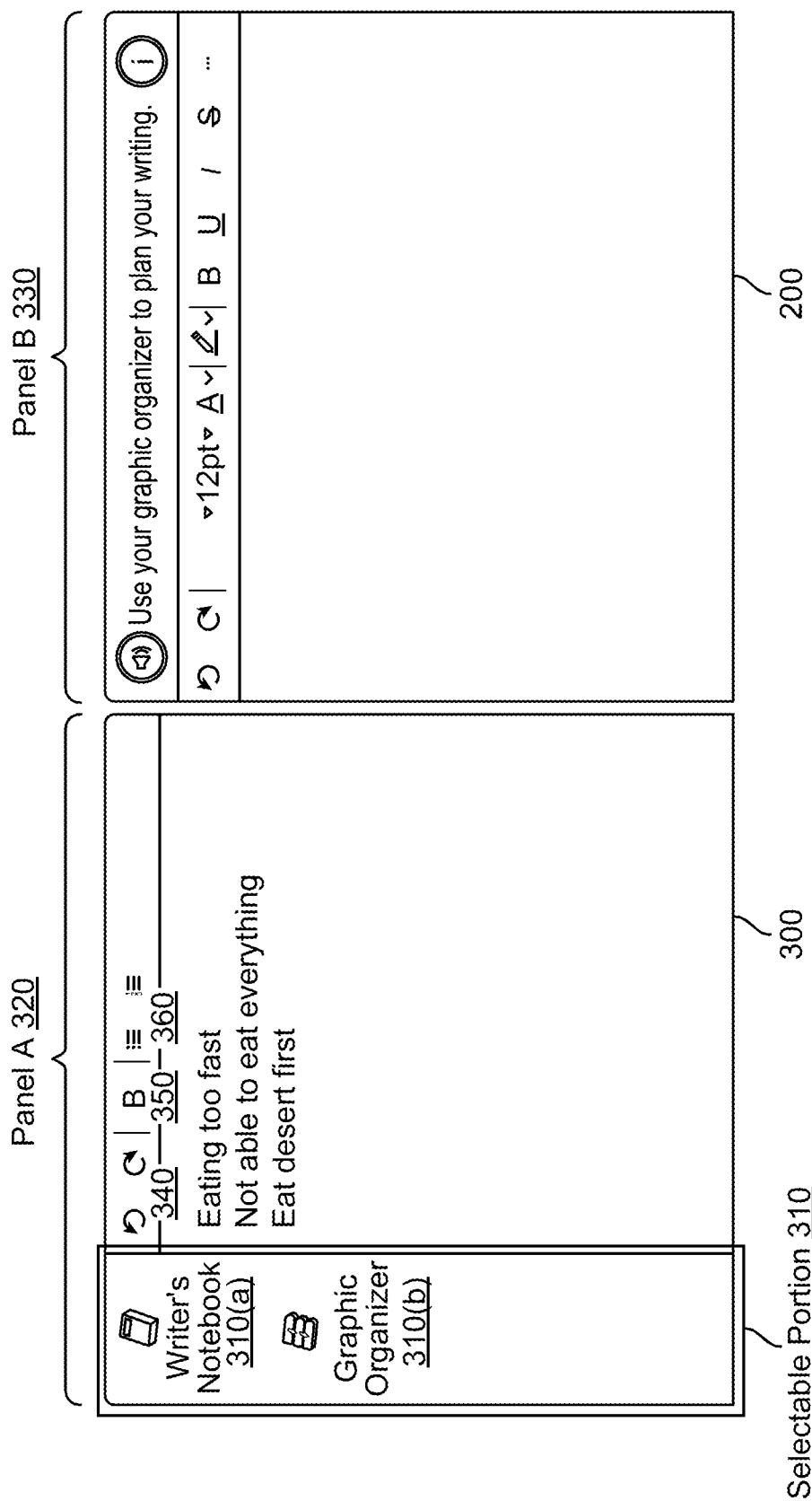
FIG. 3 is a visualization of an example writer's notebook component of the selectable portion of the configurable support materials panel.

FIG. 3 is a visualization of the split-screen UI that demonstrates how the data processing system configures the application to enable a user to view both the selectable portion of the configurable support materials panel and the input portion of the draft panel at the same time when completing a lesson. In particular, FIG. 3 displays an example writer's notebook visualization of the configurable support materials panel juxtaposed with the assignment input portion of the draft panel (e.g., the assignment input portion 200 of FIG. 2). In this case, the data processing system enables the writer's notebook visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to.

The split-screen between display Panel A 320 and display Panel B 330 helps users maintain focus between the materials configured for the lesson and the input portion of the draft panel. In particular, the side-by-side view prevents users from having to switch between multiple tabs on an online text editor or multiple text files on their local machine, which can prove very difficult for an elementary user.

In this particular example, Panel A 320 displays a writer's notebook visualization 300 next to the input portion 200. The purpose of the writer's notebook visualization 300 is to provide a space for users to jot down notes and ideas as the user prepares to complete the writing of the lesson in the input portion 200 of the draft panel. As an example, the writer's notebook view can be accessed by selecting a menu icon from the selectable portion 310 of the configurable support materials panel, which includes buttons that pertain to the specific lesson. In this case, the writer's notebook visualization can be displayed by selecting the writer's notebook button 310(a) which includes a notebook icon from the selectable portion 310.

In particular examples, the configurable support materials displayed for each lesson are specifically tailored to each lesson, such that users can be led through the sequence of lessons in a module with the proper support material options available to them. In some cases, the data structure for a lesson can specify that the selectable portion 310 includes more than one button to access other members of the selectable portion of the configurable support materials panel. In this example, the selectable portion 310 includes both the writer's notebook button 310(a) and the graphic organizer 310(b) button which includes an icon of a chart. An example graphic organizer visualization will be covered in FIG. 5. Other visualizations from the configurable support materials panel will be covered in FIGS. 3-9.

In the particular example depicted, the writer's notebook visualization 300 can include a text editor portion for inputting the notes and several text editor buttons for formatting the text. Similar to the input portion of the draft panel, the writer's notebook can include a pair of edit undo/redo buttons 340, a bold button for bolding text 350, and list formatting buttons for both bulleted and numbered lists 360. In other examples, the writer's notebook visualization can be a lined virtual notebook that users can electronically write on with an electronic stylus.

In this example, the user has written down some points in accordance with the lesson goal. In particular, the lesson instructions can provide details for the lesson goal of writing a persuasive essay about why users should be allowed to eat dessert first in a meal. In the case where the detailed instructions are written down in a list, one of the items of the list can specify to brainstorm reasons for why the user should be able to eat dessert first in their writer's notebook. In this example, the user has jotted down some points in accordance with the topic of their lesson, namely that not being able to eat dessert first promotes "eating too fast" and "not being able to eat everything. As another example, the detailed instructions can specify to write down details of when the user ate dessert first, details of when the user ate dessert last, and to compare them.

In some examples, the writer's notebook 300 remains in the selectable portion 310 after it is introduced in a specific lesson. More specifically, the writer's notebook visualization 300 can provide a brainstorming space for each user such that the user can refer back to over the course of completing the module. As the user progresses through the stages of writing in each lesson of the module, the user can select the writer's notebook button 310(a) to return to their brainstorming space to review what the user jotted down in a previous lesson or to add more thoughts.

Figure 4:
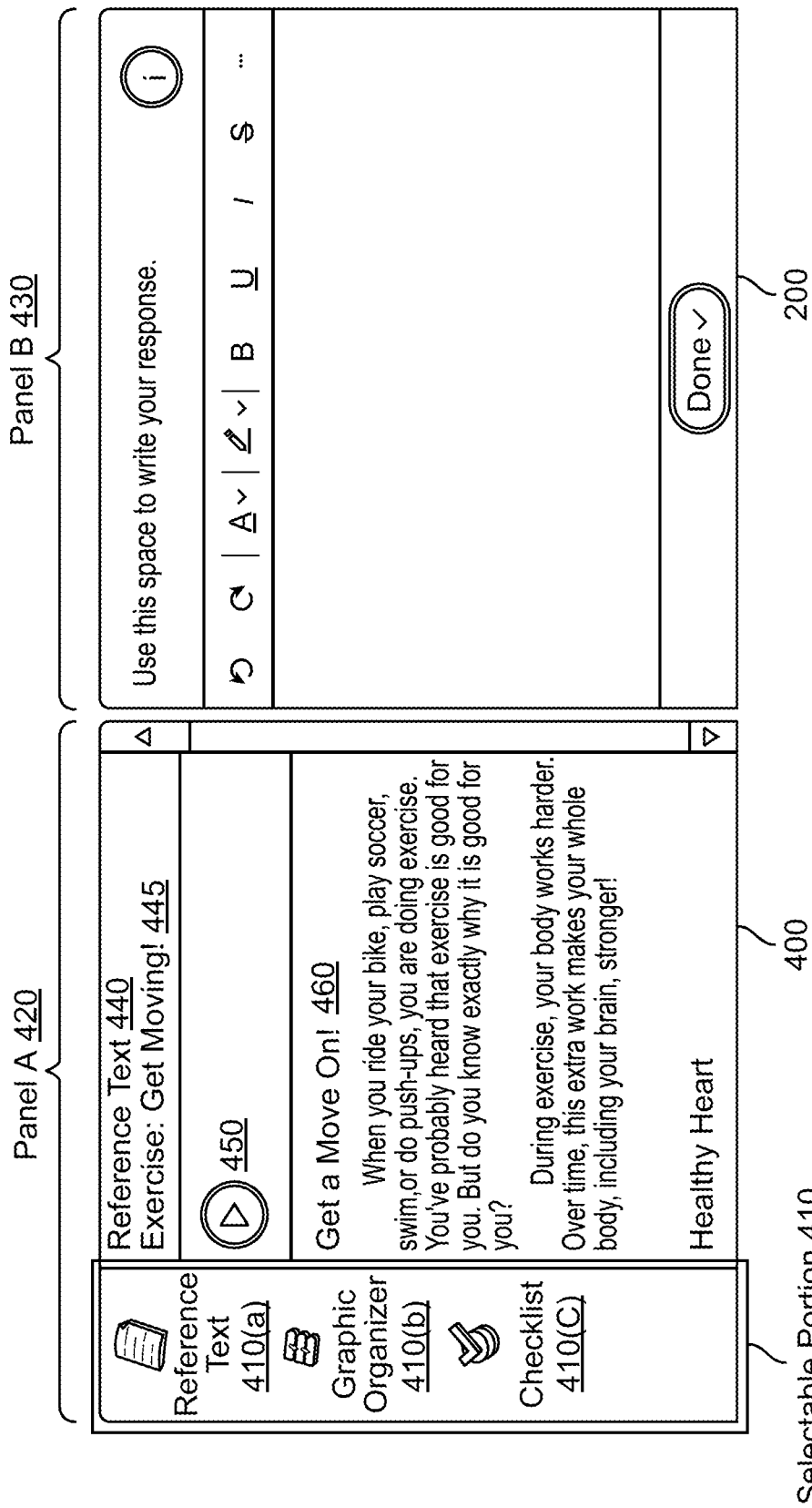
FIG. 4 is a visualization of an example reference text component of the selectable portion of the configurable support materials panel.

FIG. 4 depicts an example of the reference text visualization of the configurable support materials panel. The purpose of the reference text visualization is to provide users with reference materials for the completion of some lessons. In this case, the data processing system enables the reference text visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to. This figure also demonstrates the split-screen view: Panel A 420 displays the reference text view 400 and Panel B 430 displays the input portion 200 of the draft panel.

In some cases, the data structure for a lesson can specify that the selectable portion 410 includes button options for the reference text 410(a), graphic organizer 410(b), and checklist 410(c) views. In particular, the reference text button 410(a) includes an icon of a piece of paper, the graphic organizer button 410(b) includes an icon of a chart, and the checklist button 410(c) includes an icon of a checkmark. An example of a checklist visualization will be covered in FIGS. 6 and 7. In this particular example, the button for the reference text 410(a) has been selected, thereby displaying the one or more reference texts associated with the lesson.

In some cases, there is only one reference material associated with the lesson; in other cases, there is more than one reference material associated with the lesson. In this example, there is only one reference text associated with the lesson. In particular, the reference text visualization includes a reference text tab 440 that displays the title and the content. In other examples where two or more reference texts are associated with the lesson, each reference text can be included on its own respective tab. In this case, selecting the reference text button 410(a) from the selectable portion 410 displays a view with all of the associated reference text tabs including their respective reference text titles. More specifically, selecting each tab can display the associated content and collapse the content of other tabs.

In some examples, the content of the reference material can be highlighted using a cursor to promote close reading. Upon highlighting, a menu can be provided that allows a user to permanently highlight the text. In this case, whatever text the user highlights can be maintained as highlighted text in the reference text portion of their configurable support materials panel. In particular, the highlighting can enable a user to go back and forth between brainstorming in their writer's notebook and viewing the sections of the provided reference text that the user deems useful for the completion of the lesson.

In this particular example, the reference text tab 440 displays the title "Exercise: Get Moving" 445 and the content associated with the reference text tab 440 includes the reference text body 460 along with an audio button 450 that gives users the option to have the reference text 450 read aloud to them. In some examples, the reference text body 460 is longer than the space available to display it in. In this case, a scroll bar can be added to provide the ability to scroll through the text body 460. In other examples, the content included within the reference text tab can include pictures or videos embedded within the content. In this case, clicking on the reference tab will display both the written and visual content associated with the lesson. As a particular example that relates to the example depicted, an image that demonstrates how exercise impacts your health can be included as well as a video about maintaining a healthy lifestyle.

Figure 5A:
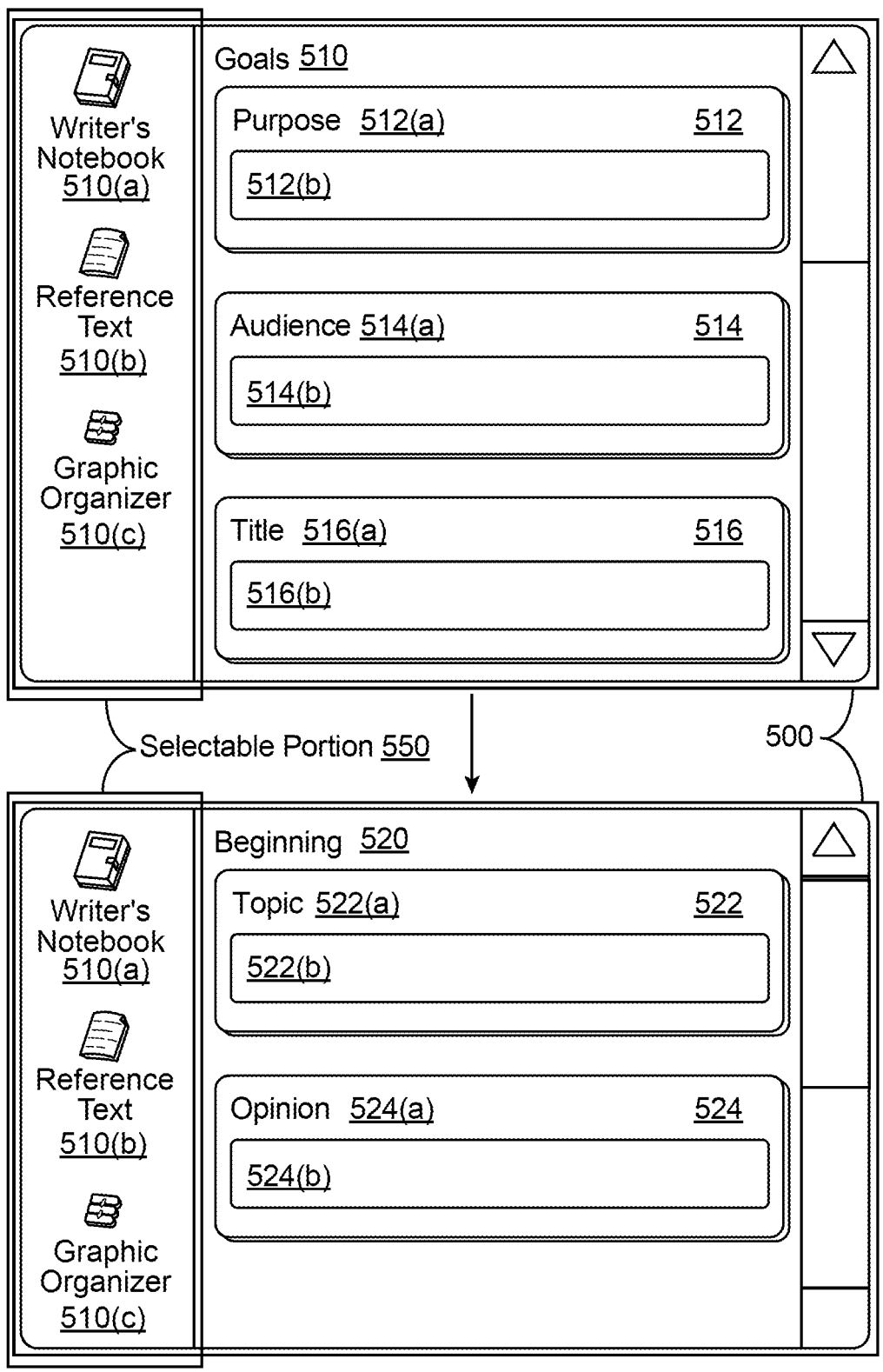
FIGS. 5A and 5B provide a visualization of an example graphic organizer component of the selectable portion of the configurable support materials panel.
Figure 5B:
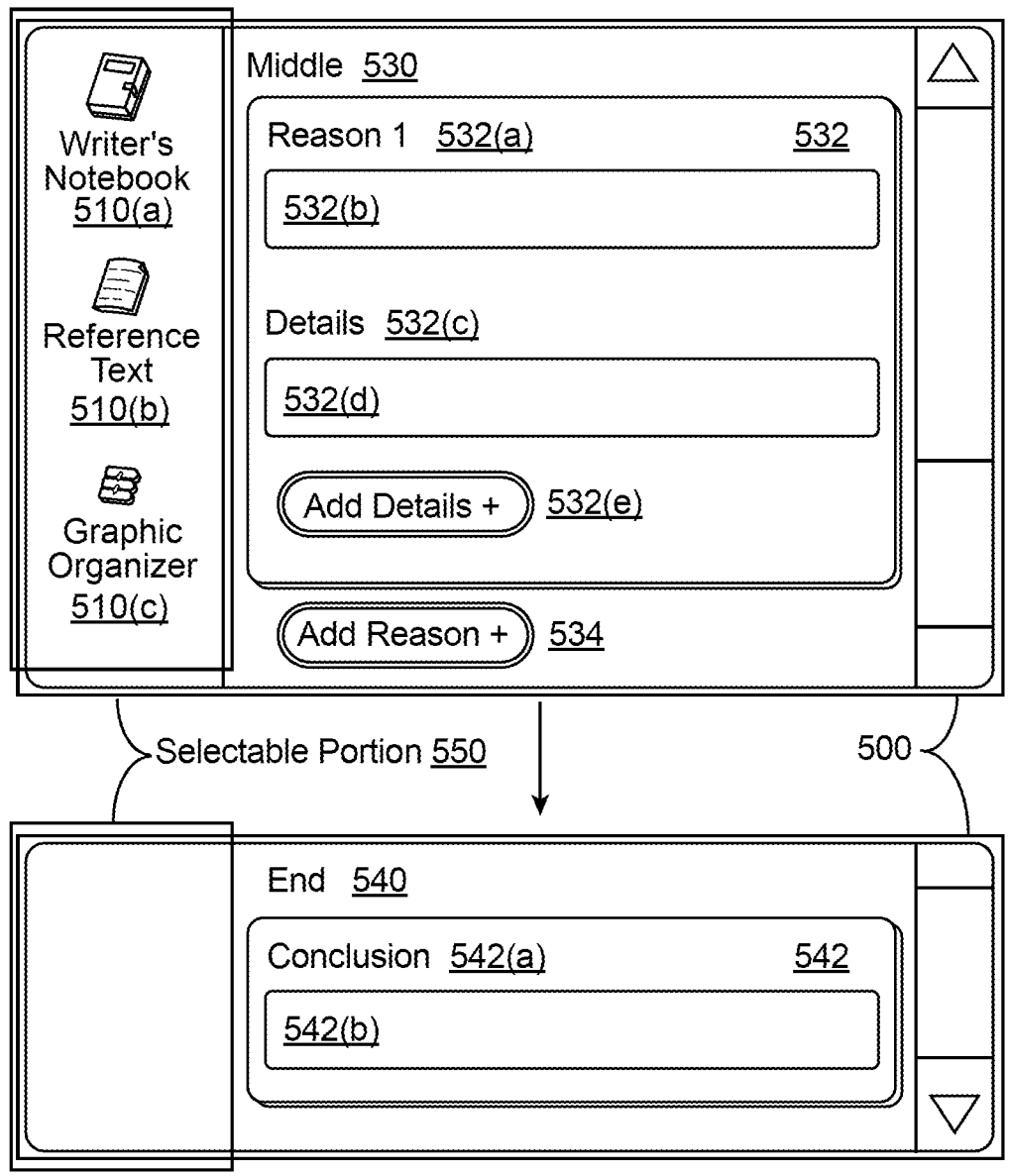

FIGS. 5A and 5B depict an example graphic organizer visualization of the configurable support materials panel. In writing education contexts, graphic organizers are visual design maps. The purpose of the graphic organizer visualization is to provide a visual aid to help users organize their thoughts into an outline. In this case, the data processing system enables the graphic organizer visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to. In particular, the graphic organizer visualization 500 can be juxtaposed with an example input portion of the draft panel. For instance, the example graphic organizer visualization of FIGS. 5A and 5B can be displayed next to the input portion of FIG. 2. FIG. 5A displays the first portion of the example graphic organizer displayed in FIGS. 5A and 5B.

Selecting the graphic organizer icon 510(*c*) from the selectable portion 550 displays the graphic organizer visualization. In some cases, the graphic organizer button 510(*c*) within the selectable portion 550 is not provided until a lesson after the writer's notebook button 510(*a*) has been introduced. In this case, the sequence of lessons in the module flow specifies that a user brainstorms before being guided to consolidate their thoughts from the writer's notebook into an outline. More specifically, users can use the graphic organizer visualization 500 as a pre-writing tool to organize what the user will write before beginning to complete the lesson assignment in the input portion 200 of the draft panel.

In particular, the graphic organizer can provide a visual outline with one or more prompt containers for the users to complete. In the example depicted, each prompt container is a blue box including one or more text prompts and one or more corresponding short text input portions. In some examples, these prompt containers can be organized into sections, such as sections of an outline. As an example, the outline can define introduction, body paragraph, and conclusion sections to organize an essay.

In this example, the first portion of the graphic organizer includes the goals 510 and beginning 520 sections. In particular, a user can organize the notes that the user jotted down in the writer's notebook into the outlined writing structure that corresponds with the overarching goals 510 and paragraph types for the goal specified by the module the user is completing.

In the particular example depicted, the module includes lessons that aid a user in drafting and editing a persuasive essay. In this case, the outline can include a goals section 510 to identify the overarching goals of the essay, such as the purpose of the essay and the target audience. In this example, each aspect of the outline pertaining to the goal section is displayed in a separate container. In particular, the goals section 510 includes separate containers for the purpose 512, audience 514, and title 516. As an example, the purpose container 512, can include a text prompt that designates the container as purpose 512(*a*) along with a corresponding short text input portion 512(*b*) for a user to define the purpose of the persuasive essay. Likewise, the audience container 514, can include a text prompt 514(*a*) and a corresponding text input portion 514(*b*) for a user to define their target audience, and the title container 516 can include a text prompt 516(*a*) with an input portion 516(*b*) for the title. In other examples, each aspect of the outline pertaining to the goal section can be displayed in the same container.

In some cases, the contents of the graphic organizer cannot all be rendered on the display at the same time. In this case, a scroll bar 560 can be provided such that the user can access other sections and component containers of the graphic organizer. In this particular example, scrolling down with the scroll bar 560 displays the beginning section 520 of the graphic organizer to help users organize their introduction paragraph. In the case of the persuasive essay, the beginning section 520 includes a topic container 522 and an opinion container 524 to display the corresponding prompts 522(*a*) and 524(*a*) and text input portions 522(*b*) and 524(*b*).

FIG. 5B displays the second portion of the example graphic organizer displayed in FIGS. 5A and 5B. The second portion can be accessed by scrolling down from the first portion of the graphic organizer as displayed in FIG. 5A. In this example, the second portion includes the middle section 530 and the end Section 540.

The middle section 530 includes body paragraph outline containers. In this example, the middle section is broken into one container for each body paragraph. More specifically, container 532 corresponds with the first body paragraph, and includes prompts for reason 1 532(*a*) with input 532(*b*) and details 532(*c*). The container format helps guide the user to organize their supporting details for reason 1. In this particular example, the default body paragraph container only includes one detail input for the reason. In this case, the first body paragraph container 532 can additionally include a button to add details 532(*e*) that enables a user to include more supporting details for reason 1 in the reason 1 container 532.

Furthermore, in this example, only one middle paragraph container is automatically rendered upon clicking the graphic organizer button 510(*c*) from the selectable portion 550. In this case, a button to add reasons 534 can additionally be displayed within the middle section 530 to add another paragraph container to the middle section. In other examples, the middle section 530 of the graphic organizer can be configured to display the exact number of body paragraphs expected for the lesson. In this case, the middle section 530 can include multiple reason containers and no button to add reasons 534.

After completing the outline for the beginning and middle Sections 520 and 530, the user can unify their thoughts by outlining a concluding paragraph. In this example, the end section 540, which corresponds with the concluding paragraph, can contain a conclusion container 542 that prompts 542(a) the user to write a restatement of their purpose and opinion in a concluding statement.

Figure 6:
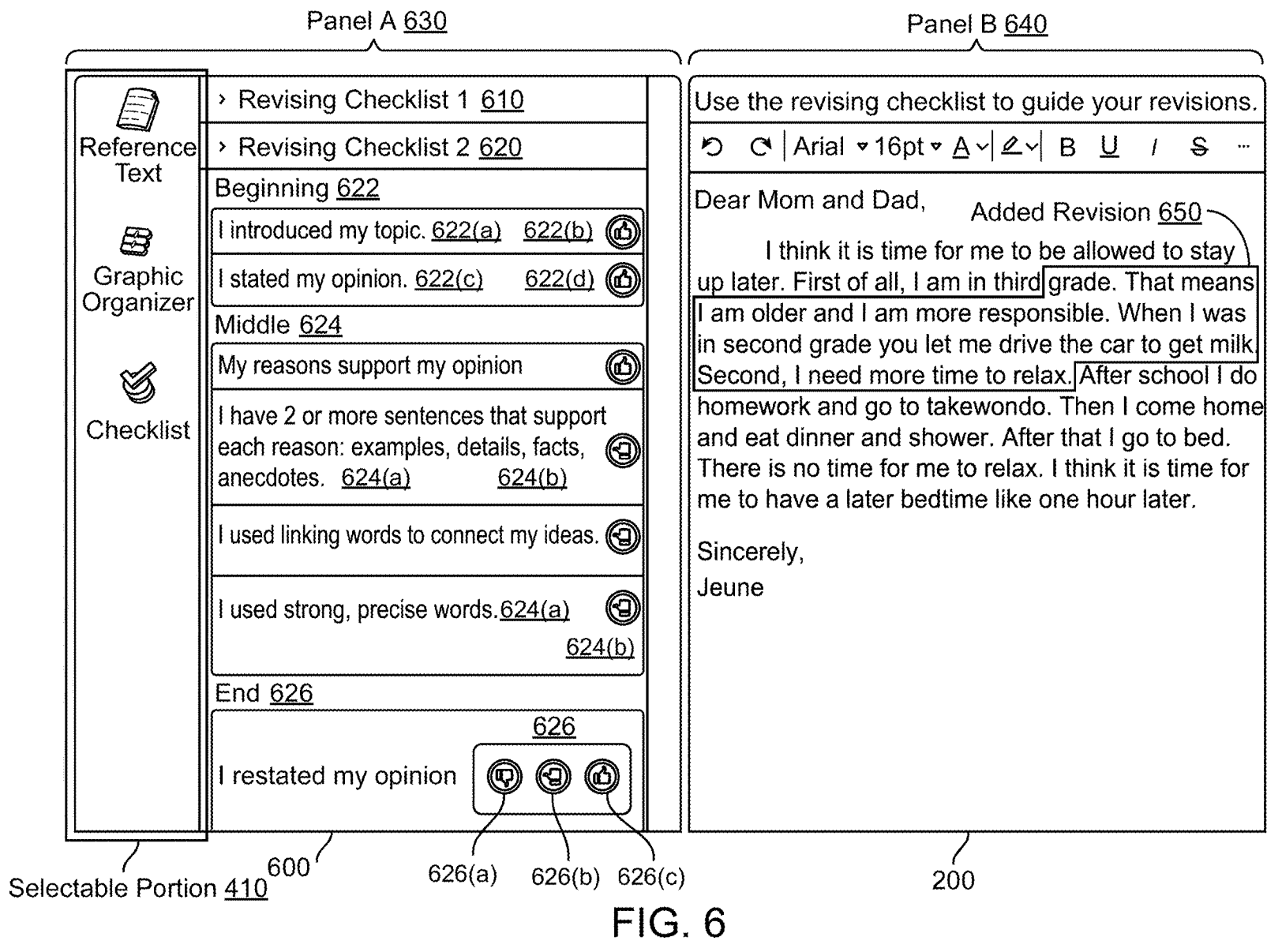

FIG. 6 depicts an example revision checklist visualization of the configurable support materials panel. In this case, the data processing system enables the revision checklist visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to. This figure also demonstrates the split-screen view: Panel A 630 displays the revising checklist view 600 and Panel B 640 displays the user's prior work in the input portion 200 of the draft panel. In particular, this split-screen view enables the user to view both their writing and the revision guidelines at the same time, thereby facilitating the revision process.

In this lesson, the selectable portion 410 includes button options for the reference text 410(a), graphic organizer 410(b), and checklist 410(c) views. In this case, the button for the checklist 410(c) has been selected, thereby displaying the one or more checklists associated with the lesson. In some examples, multiple revision stages can be completed as part of different lessons of a module. More specifically, revision checklists can be assigned in multiple lessons of the module. In this case, the revision checklists can restate goals or can incorporate new goals for self-reflection or self-evaluation in accordance with the editing stage of the lesson.

In this case, the checklist visualization is for an intermediate revision checklist to guide users through revisions intermediate to their final submission. The purpose of the revision checklist is to guide users through a self-reflective revision stage that encourages the user to reflect on how they did with their writing before or while making revisions. More specifically, a revision checklist can be used to focus a user's attention on a particular goal of the lesson as the user reflects upon their writing during the editing process. In some cases, the revision checklist can also guide users through a self-evaluation following self-reflection, in which case the checklist can involve the assignment of a self-assessment score. By encouraging users to reflect upon or evaluate their own work with respect to concrete goals, users can be guided to critically assesses their own work using a structured checklist that emphasizes aspects of strong writing during the revision process.

In this particular case, selecting the reference text button renders a display of two revision checklists. In some examples, the UI for each lesson specifies that all revision checklists of previous lessons are left accessible in the visualization so users can revisit their previous revisions. In this case, revising checklist 1 610 was assigned in an earlier lesson in the sequence of the lessons in the module than revising checklist 2 620. As an example, selecting each checklist can collapse the view of the other checklist, e.g., selecting revising checklist 1 610 can collapse the view for revising checklist 2 620 to reveal checklist 1 610.

Each revision checklist can be broken in outline sections that mirror the graphic organizer of the module and can include statements with corresponding self-reflection icons 636 for self-reflection. In this particular example, the self-reflection icons 636 depicting different thumbs guide the user to reflect on how their writing performs with respect to the statement. In particular, the thumbs-up 636(a), thumbs-sideways 636(b), and thumbs-down 636(c) icons indicate good, mediocre, and poor performance, respectively. As another example, a smiley, straight face, and frowny face can be used to guide user self-reflection. In some cases, the checklist can also guide the user through self-evaluation, in which case self-evaluation icons can be used to assign a self-assessment score. In particular, the checklist can guide a user to assign a self-assessment score corresponding to a number of stars out of 5 or 10. In this case, a user assigns an actual self-assessment score value corresponding with how the user feels their writing performs with respect to the statement. In some examples, the self-reflection or self-evaluation icons can appear in a self-reflection panel, which will be described in further detail below.

In the example depicted, the module pertains to writing a persuasive letter and the revision checklist 2 620 includes beginning 622, middle 624, and end 626 sections that correspond with the introduction, body support, and conclusion of the letter. The user's prior work is rendered in Panel B 640 in accordance with what is specified by the computer program. In particular, the persuasive letter can be about the user appealing to their parents to let them stay up later.

In some examples, a revising checklist section includes multiple statements for self-reflection. In particular, the beginning section 622 can include statements for reflection such as "I introduced my topic" 622(a). In this case, the user has selected the thumbs-up graphic 622(b) after self-reflection. Likewise, the thumbs-up graphic 622(d) has been selected for "I stated my opinion" 622(c). In some examples, the selection of the self-reflection icon can result in a change to the statement box, such as the rendering of a color associated with the self-reflection icon. In this example, the middle section 624 includes statements such as "My reasons support my opinion" and more targeted statements for reflection such as "I have 2 or more sentences that support each reason . . . ". In this particular case, the user has reflected upon their average performance on "I used strong, precise words" 624(a) and chosen a corresponding a sideways thumb self-reflection icon 624(b).

The split-screen view facilitates the revision process by providing the criteria for self-reflection or self-evaluation on Panel A 630 next to the user's work on Panel B 640. More specifically, as a user reflects upon or evaluates their work (e.g., by assigning a self-assessment score with respect to the statements of the checklist), the split-screen view promotes the user's ability to edit their work while still viewing the revision checklist.

As an example, after choosing the sideways thumb self-reflection icon 624(b) for the statement "I have 2 or more sentences that support each reason: examples, details, facts, and anecdotes" 624(a), the user can identify reasons where the user did provide proper support and reasons where the user did not provide proper support in their writing on Panel B 640. More specifically, the user can make a targeted revision with respect to their self-reflection or self-evaluation. For example, upon reflecting, the user can realize that they did not include two or more details for the reason of "I am in third grade" as justification for being old enough to stay up late. The user can then add the revision 650 "When I was in second grade you let me drive the car to get milk," to further explain and justify the reason.

In other cases, there is only one statement for reflection in a section. For example, the end section 626 includes the statement "I restated my opinion" for self-reflection. In an example in which the user module includes a sequence of lessons that relate to writing an essay, the end section can include other statements that pertain to the structure of the conclusion paragraph.

As depicted in the end section 626 of this particular example, when a user selects a statement for reflection, a self-reflection panel 626 can render that allows them to select the self-reflection icon that corresponds with their self-reflection. In this case, the self-reflection panel includes the icons for thumbs-down 626(*a*), thumbs-sideways 626(*b*), and thumbs-up 626(*c*). The user can then select which thumb icon corresponds with the user's self-reflection for the revision statement using the self-reflection panel 626. In the case that the checklist also guides the user through self-evaluation and the assignment of a self-assessment score, a similar self-evaluation panel can render that allows them to assign their corresponding self-assessment score.

In some cases, the sequence of lessons in a module includes both one or more intermediate revision lessons and a final editing stage. FIG. 7 depicts an example of a final editing checklist visualization of the configurable support materials panel. In this case, the data processing system enables the final editing checklist visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to. The final editing checklist 710 guides users through their final revisions before submission. This figure also demonstrates the split-screen view: Panel A 720 displays the revising checklist view 700 and Panel B 730 displays the input portion 200 of the draft panel. In particular, this split-screen view enables the user to view both their writing and their final editing guidelines at the same time, thereby facilitating the final editing process before submission.

In some examples, the final editing checklist visualization 700 can be similar to the intermediate revision checklist visualization (e.g., the example revision checklist visualization in FIG. 6). In this particular example, the editing checklist 700 can include statements with corresponding self-reflection icons 714(*b*), 716(*b*), 718(*b*) for self-reflection. In this particular example, the self-reflection icons depicting different thumbs guide the user to reflect on how their writing performs with respect to the statement. In particular, the thumbs-up 714(*b*), thumbs-sideways 716(*b*), and thumbs-down 718(*b*) icons indicate good, mediocre, and poor performance, respectively. As another example, a smiley, straight face, and frowny face can be used to guide user self-reflection. In some cases, the checklist can also guide the user through self-evaluation, in which case self-evaluation icons can be used to assign a self-assessment score. In particular, the checklist can guide a user to assign a self-assessment score corresponding to a number of stars out of 5 or 10. In this case, a user assigns an actual score value to the user's self-reflection. In some examples, the self-reflection or self-evaluation icons can appear in a self-reflection panel, which will be described in further detail below.

As an example, the final editing checklist can include sections that pertain to basic tenants of writing. In particular, section 712 pertains to capitalization and includes statements such as "My sentences begin with capital letters." 714(*a*), "Proper nouns are capitalized." 716(*a*), "I checked that names with titles are capitalized." 718(*a*). In this case, the user has chosen the thumbs-up 714(*b*), thumbs sideways 716(*b*), and thumbs down 718(*b*) self-reflection icons, respectively, after reflection upon the user's work. As another example, sections can pertain to punctuation, spelling, grammar, and sentence construction. In particular, an example statement for a punctuation section can specify "I checked for correct use of commas" and an example statement for spelling can specify "I checked for correct spelling". Likewise, an example statement for a punctuation section can specify "I used a subordinating conjunction" and an example statement for sentences can specify "My sentences vary in length".

As a user uses the editing checklist, the split-screen view promotes their ability to complete their final edits in line with their self-reflection or self-evaluation by providing the criteria for self-reflection on Panel A 730 next to the user's work on Panel B 740. After the user has completed their final edits in line with the editing checklist, the user can submit their work to the administrator using the submission button 740. In the example depicted, the submission button 740 can be a button labeled as "Done" with a checkmark. In some examples, the submission button 740 remains grayed out and unselectable until the user has completed assigning self-assessment icons to each of the editing checklist statements.

Figure 8:
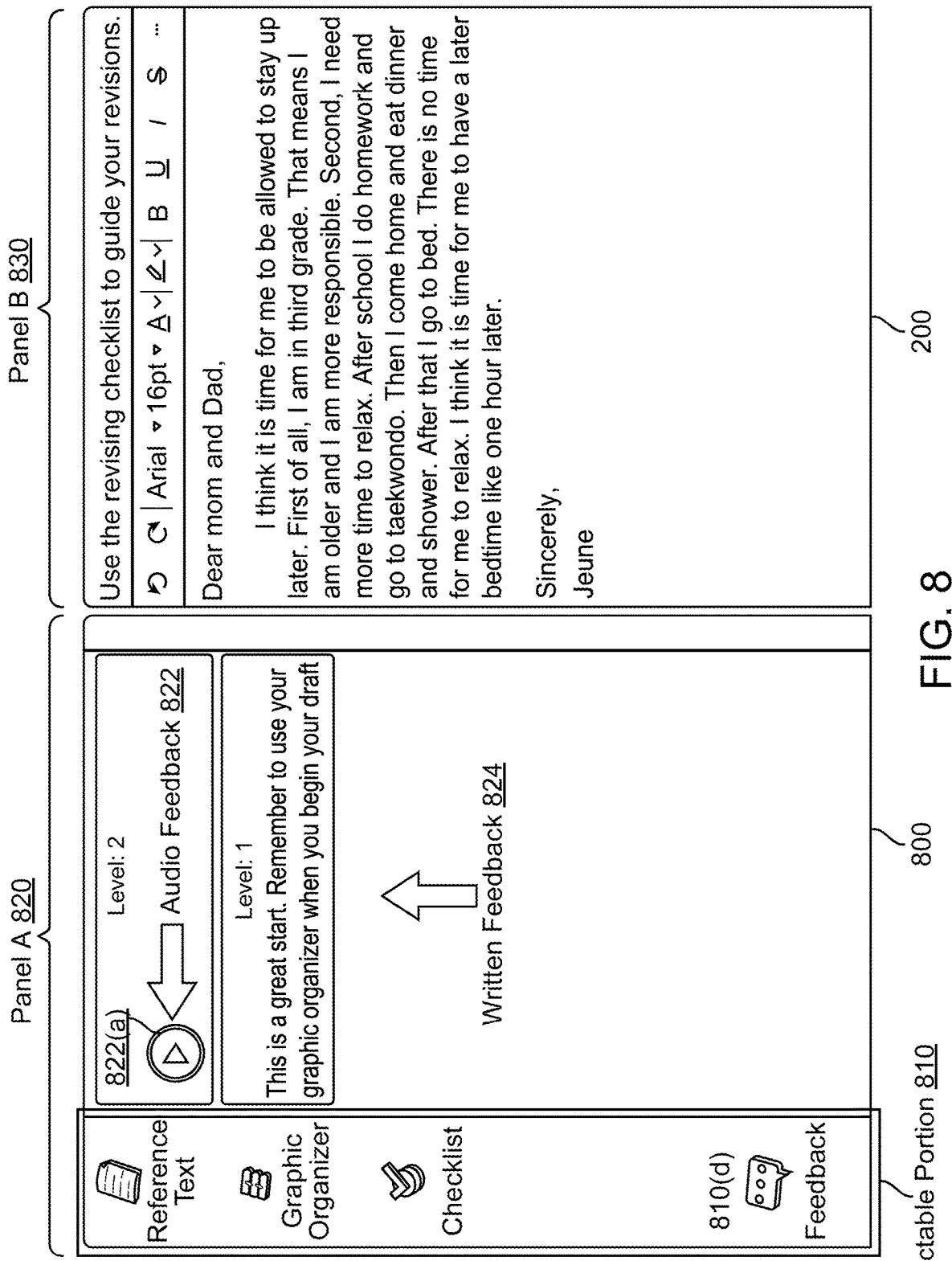
FIG. 8 is a visualization of an example feedback portion of the selectable portion of the configurable support materials panel.

In some examples, a user can receive feedback after the completion of a lesson. FIG. 8 depicts an example of the feedback section of the configurable support materials panel. In this case, the data processing system enables the feedback visualization by using the one or more appropriate primary-foreign key relationships to identify and access the appropriate visualization content for the selectable portion of the configurable support materials panel of the lesson. In particular, the primary-foreign key relationships specify the appropriate resources to include in the UI for the stage of writing the lesson pertains to. This figure also demonstrates the split-screen view: Panel A 820 displays the feedback view 800 and Panel B 830 displays the input portion 200 of the draft panel. In particular, this split-screen view enables the user to view both their writing in the input portion and feedback at the same time, thereby facilitating the revision process.

As an example, the feedback displayed can come from the administrator, e.g. a teacher, who has reviewed a user's work, e.g. a student. In this case, a teacher can elect to review student work after each lesson. In other cases, a teacher can elect to review student work after one or more intermediate lessons. As another example, the feedback displayed can come from student peers through a peer review process. More specifically, feedback can be accessed by selecting the feedback button 810(*d*) from the selectable portion 810. In some examples, the feedback option only appears if there is feedback associated with the student's previously submitted lesson work to be displayed.

In this particular example, the user can receive feedback after their intermediate lesson submissions and has received feedback for two different previously completed lessons of the module. In particular, the feedback can include one or more types, such as written or recorded audio feedback. In another example, the feedback can additionally include recorded video feedback. In the case where there are one or more options for the type of feedback, the reviewer can opt to either write out their feedback, directly record the feedback, or upload the feedback.

In this case, the user has received different types of feedback for their lesson 1 and lesson 2 submissions: written feedback 824 and audio feedback 822, respectively. In other examples, the only feedback displayed is for the most recently reviewed lesson, e.g., the visualization 800 does not include previously given feedback. More specifically, the feedback for both lessons is displayed in separate containers on the feedback visualization 800. In some examples, the audio feedback 822 is accompanied by a play button 822(*a*) that plays the feedback out loud when selected.

Figure 9:
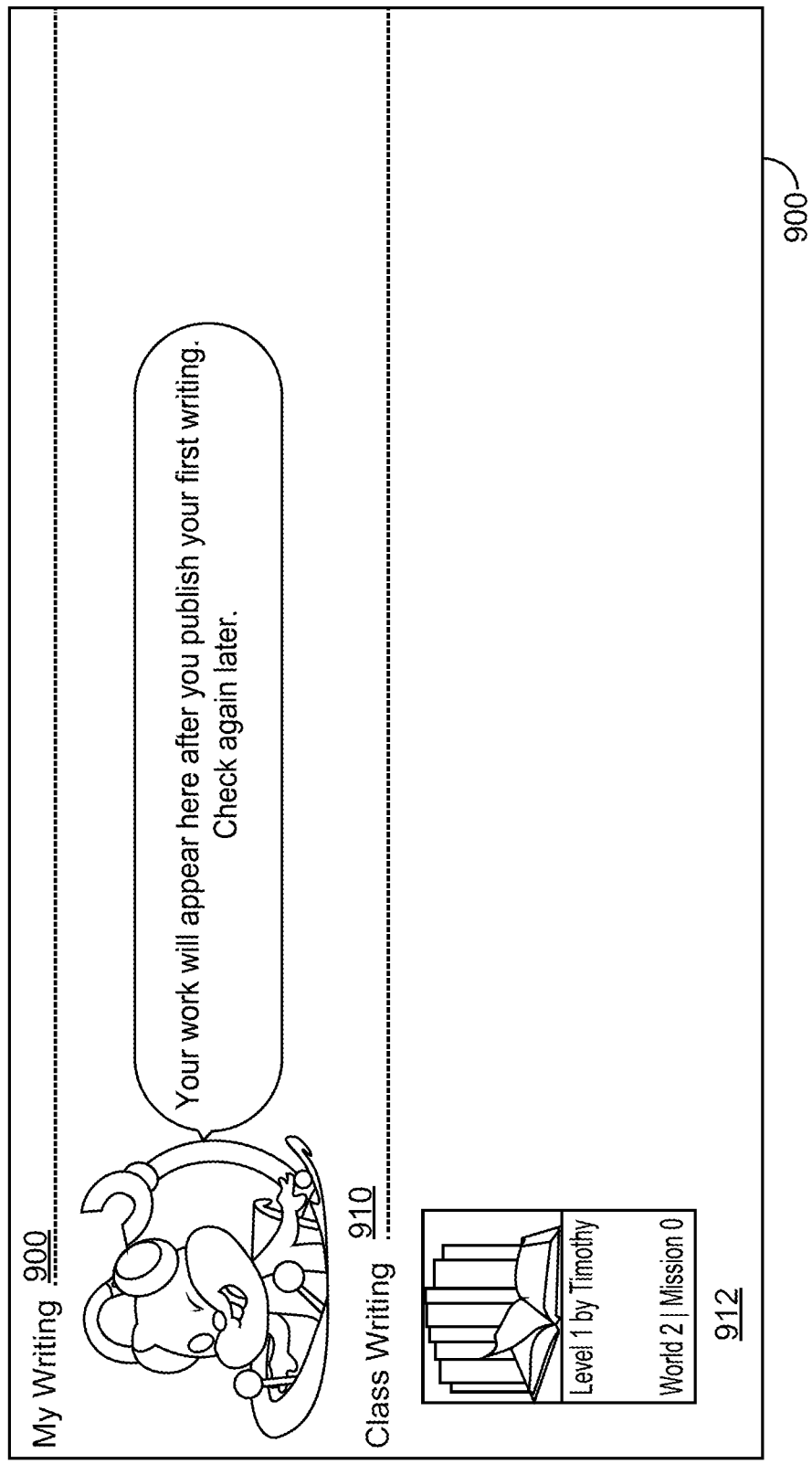
FIG. 9 is a visualization of an example writing library of the selectable portion of the configurable support materials panel.

FIG. 9 depicts an example writing library, where completed assignments can be displayed for both the user that wrote them and other users that are completing the same sequence of lessons concurrently. For example, the writing library can display the work of other students in the same class as the student user. In this case, the data processing system enables the writing library visualization by using the one or more appropriate primary-foreign key relationships to identify and access the appropriate visualization content for the selectable portion of the configurable control materials panel of the lesson. In particular, the primary-foreign key relationships specify the appropriate resources to include in the UI for the stage of writing the lesson pertains to. As an example, the writing library visualization 900 can be accessible using the selectable portion of any of the preceding figures. In the particular example depicted, selecting the writing library from the selectable portion results in a one-panel display. In this case, users are directed to focus their whole attention on reading either their published work or the completed work of other users, e.g., other students in their class or grade. In some cases, a user's submitted work automatically appears in the writing library upon completion of a lesson.

In this example, the writing library includes a self-writing shelf ("My Writing") 900 and a class writing ("Class Writing") shelf 910. In this case, the user viewing the writing library panel 900 has yet to submit the final lesson assignment of the module, so it does not appear on their self-writing shelf 900. As an example, the user can elect to publish their work after submitting their final lesson. In another example in which the user has submitted and published their work, their work can appear in a published panel for viewing.

For example, the class writing shelf 910 includes a published panel 912 for viewing another peers' work 912. In this case, the panel 912 displays "Level 1 by Timothy". When selected, the user can select Timothy's work and the submission Timothy published for "Level 1" can be rendered.

Figure 10:
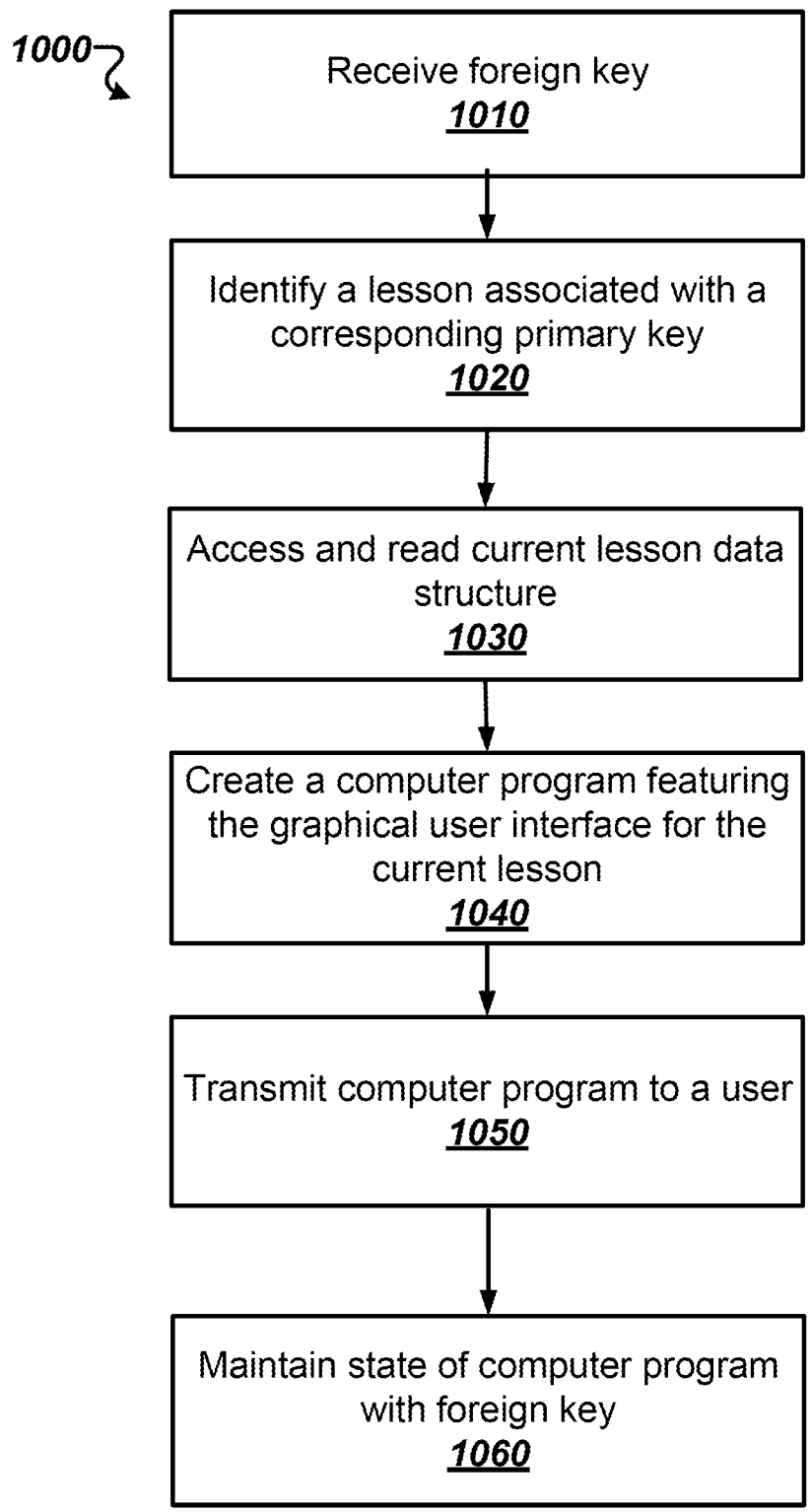
FIG. 10 is a flowchart that describes a process for satisfying a request for lesson content.

FIG. 10 is a flow chart of an example process for creating and maintaining a computer program that specifies the rendering of a graphical user interface of an elementary writing learning management application. For convenience, the process 1000 will be described as being performed by a system of one or more computers located in one or more location. For example, a data processing system appropriately programmed in accordance with this specification, such as the data processing system 100 of FIG. 1, can perform the process 1000.

In particular, the data processing system can receive a foreign key (step 1010) that characterizes a specific lesson of a module in database including one or more data structures that represent modules. As an example, the foreign key can be received through a secure internet communication protocol. As another example, the foreign key can be received through credentialed access to a file including foreign keys. Based on the foreign key, the system can access from a hardware storage device, one or more data structures and assess whether their primary key matches the foreign key.

After identifying the lesson data structure with the correct associated primary key (step 1020), the system can access and read the current lesson data structure and access the contents of the current lesson (step 1030). The system can then create a computer program to incorporate the contents of the data structure that features the appropriate graphical user interface for the current lesson (step 1040). As an example, the computer program can cause the rendering of a visual representation of a lesson of an education module that includes an input portion (e.g., an input portion of a draft panel) and a selectable portion (e.g., a selectable portion of a configurable support materials panel) that is configured to display a number of options associated with that specific lesson. In particular, the number of options associated with the specific lesson can involve the optional display of such as a writer's notebook for jotting down notes and capturing ideas, reference texts when applicable to the assignment, a graphic organizer to organize thoughts in the applicable assignment framework before writing, an interactive revision checklist for self-reflection or self-evaluation before submitting intermediate assignments to the administrator, an editing checklist for polishing work before a final submission, a feedback portion, and a writing library for viewing submitted lesson work.

The system can then transmit the computer program to a user (step 1050) through any appropriate means, e.g., through the internet or a local file system, and can maintain the state of the computer program using the foreign key (step 1060). More specifically, the state of the computer program can specify which educational module is currently being accessed and which lesson of that education module is currently being rendered. In some cases, specifying which lesson is being rendered selects the one or more visual representations that will be displayed in juxtaposition with the selectable portion in accordance with that lesson.

In particular, the ordering of the sequence of lessons in a module can be specified as a numerical identifier within each lesson data structure. As an example, the system can receive notification of any change to the foreign key that would trigger transitioning to another lesson. The computer program can broadcast to the system when updates to the computer program are necessary in line with advancement to a next stage of the lesson. The system can identify a new foreign key characterizing the next lesson and begin the identification and accessing of the appropriate educational content in order to generate a new computer program.

Figure 11:
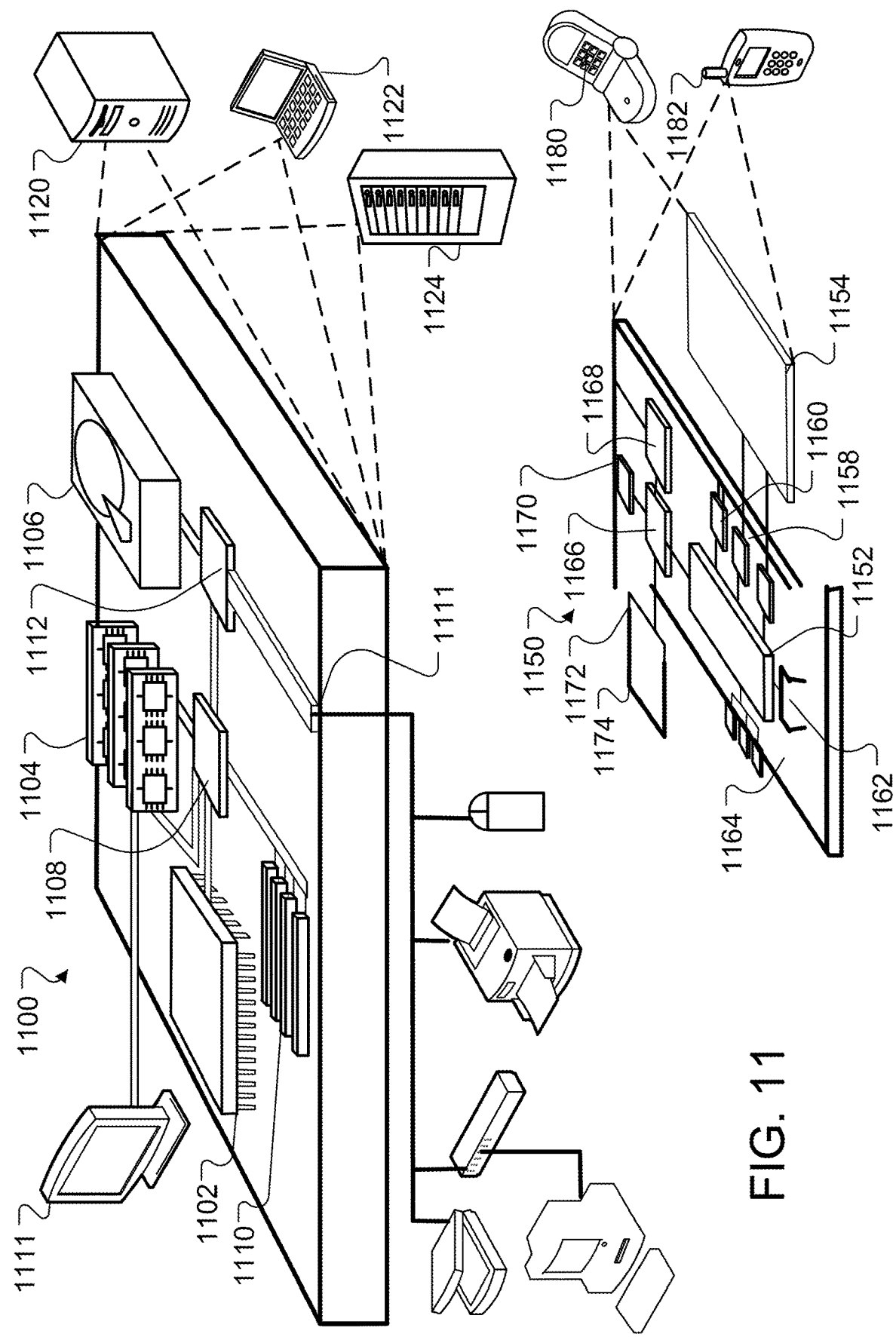
FIG. 11 is a block diagram of system components that can be used to implement a data processing system for satisfying a request for lesson content.

FIG. 11 illustrates an example of a computing device and a mobile computing device that can be used to implement the techniques described here.

FIG. 11 shows an example of example computer device 1100 and example mobile computer device 1150, which can be used to implement the techniques described herein. For example, a portion or all of the operations for configuring, accessing, identifying, and delivering a plurality of data structures that include interfaces configured to guide users through an elementary school writing curriculum based on interactions of users with one or more of the interfaces may be executed by the computer device 1100 and/or the mobile computer device 1150. Computing device 1100 is intended to represent various forms of digital computers, including, e.g., laptops, desktops, workstations, personal digital assistants, servers, blade servers, mainframes, and other appropriate computers. Computing device 1150 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1100 includes processor 1102, memory 1104, storage device 1106, high-speed interface 1108 connecting to memory 1104 and high-speed expansion ports 1110, and low-speed interface 1112 connecting to low-speed bus 1111 and storage device 1106. Each of components 1102, 1104, 1106, 1108, 1110, and 1112, are interconnected using various busses, and can be mounted on a common motherboard or in other manners as appropriate. Processor 1102 can process instructions for execution within computing device 1100, including instructions stored in memory 1104 or on storage device 1106 to display graphical data for a GUI on an external input/output device, including, e.g., display 1111 coupled to high-speed interface 1108. In other implementations, multiple processors and/or multiple busses can be used, as appropriate, along with multiple memories and types of memory. Also, multiple computing devices 1100 can be connected, with each device providing portions of the necessary operations (e.g., as a server bank, a group of blade servers, or a multi-processor system).

Memory 1104 stores data within computing device 1100. In one implementation, memory 1104 is a volatile memory unit or units. In another implementation, memory 1104 is a non-volatile memory unit or units. Memory 1104 also can be another form of computer-readable medium (e.g., a magnetic or optical disk. Memory 1104 may be non-transitory.)

Storage device 1106 is capable of providing mass storage for computing device 1100. In one implementation, storage device 1106 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1104, storage device 1106, memory on processor 1102, and the like.)

High-speed controller 1108 manages bandwidth-intensive operations for computing device 1100, while low-speed controller 1112 manages lower bandwidth-intensive operations. Such allocation of functions is an example only. In one implementation, high-speed controller 1108 is coupled to memory 1104, display 1111 (e.g., through a graphics processor or accelerator), and to high-speed expansion ports 1110, which can accept various expansion cards (not shown). In the implementation, low-speed controller 1112 is coupled to storage device 1106 and low-speed expansion port 1111. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1100 can be implemented in a number of different forms, as shown in the figure. For example, it can be implemented as standard server 1120, or multiple times in a group of such servers. It also can be implemented as part of rack server system 1124. In addition or as an alternative, it can be implemented in a personal computer (e.g., laptop computer 1122.) In some examples, components from computing device 1100 can be combined with other components in a mobile device (not shown), e.g., device 1150. Each of such devices can contain one or more of computing device 1100, 1150, and an entire system can be made up of multiple computing devices 1100, 1150 communicating with each other.

Computing device 1150 includes processor 1152, memory 1164, an input/output device (e.g., display 1154, communication interface 1166, and transceiver 1168) among other components. Device 1150 also can be provided with a storage device, (e.g., a microdrive or other device) to provide additional storage. Each of components 1150, 1152, 1164, 1154, 1166, and 1168, are interconnected using various buses, and several of the components can be mounted on a common motherboard or in other manners as appropriate.

Processor 1152 can execute instructions within computing device 1150, including instructions stored in memory 1164. The processor can be implemented as a chipset of chips that include separate and multiple analog and digital processors. The processor can provide, for example, for coordination of the other components of device 1150, e.g., control of user interfaces, applications run by device 1150, and wireless communication by device 1150.

Processor 1152 can communicate with a user through control interface 1158 and display interface 1156 coupled to display 1154. Display 1154 can be, for example, a TFT LCD (Thin-Film-Transistor Liquid Crystal Display) or an OLED (Organic Light Emitting Diode) display, or other appropriate display technology. Display interface 1156 can comprise appropriate circuitry for driving display 1154 to present graphical and other data to a user. Control interface 1158 can receive commands from a user and convert them for submission to processor 1152. In addition, external interface 1162 can communicate with processor 1142, so as to enable near area communication of device 1150 with other devices. External interface 1162 can provide, for example, for wired communication in some implementations, or for wireless communication in other implementations, and multiple interfaces also can be used.

Memory 1164 stores data within computing device 1150. Memory 1164 can be implemented as one or more of a computer-readable medium or media, a volatile memory unit or units, or a non-volatile memory unit or units. Expansion memory 1174 also can be provided and connected to device 1150 through expansion interface 1172, which can include, for example, a SIMM (Single In Line Memory Module) card interface. Such expansion memory 1174 can provide extra storage space for device 1150, or also can store applications or other data for device 1150. Specifically, expansion memory 1174 can include instructions to carry out or supplement the processes described above, and can include secure data also. Thus, for example, expansion memory 1174 can be provided as a security module for device 1150, and can be programmed with instructions that permit secure use of device 1150. In addition, secure applications can be provided through the SIMM cards, along with additional data, (e.g., placing identifying data on the SIMM card in a non-hackable manner.)

The memory 1164 can include, for example, flash memory and/or NVRAM memory, as discussed below. In one implementation, a computer program product is tangibly embodied in a data carrier. The computer program product includes instructions that, when executed, perform one or more methods, e.g., those described above. The data carrier is a computer- or machine-readable medium (e.g., memory 1164, expansion memory 1174, and/or memory on processor 1152), which can be received, for example, over transceiver 1168 or external interface 1162.

Device 3050 can communicate wirelessly through communication interface 1166, which can include digital signal processing circuitry where necessary. Communication interface 1166 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1168. In addition, short-range communication can occur, e.g., using a Bluetooth®, WiFi, or other such transceiver (not shown). In addition, GPS (Global Positioning System) receiver module 1170 can provide additional navigation- and location-related wireless data to device 1150, which can be used as appropriate by applications running on device 1150. Sensors and modules such as cameras, microphones, compasses, accelerators (for orientation sensing), etc. may be included in the device.

Device 1150 also can communicate audibly using audio codec 1160, which can receive spoken data from a user and convert it to usable digital data. Audio codec 1160 can likewise generate audible sound for a user, (e.g., through a speaker in a handset of device 1150.) Such sound can include sound from voice telephone calls, can include recorded sound (e.g., voice messages, music files, and the like) and also can include sound generated by applications operating on device 1150.

Computing device 1150 can be implemented in a number of different forms, as shown in the figure. For example, it can be implemented as cellular telephone 1180. It also can be implemented as part of smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A computer implemented method including:
reading, from a hardware storage device, a plurality of data structures representing educational modules, with each data structure including primary keys for accessing other data structures representing lessons of an educational module pertaining to a writing assignment, with an educational module being associated with a particular learning goal and with a lesson being associated with a sub-goal for the writing assignment;
reading, from a hardware storage device, ordering data specifying an order in which the educational modules are rendered and an order in which lessons are rendered for each educational module;
based on the plurality of data structures and the ordering data, generating a computer program for causing rendering of a graphical user interface including a visual representation of a lesson of an educational module as:
an input portion for receiving response content comprising input text associated with the writing assignment;
a selectable portion for displaying, based on the response content:
a first visual representation of a writer's notebook for note taking and planning of the response content,
a second visual representation specifying one or more reference texts when applicable to the lesson, a third visual representation of a graphic organizer for structural organization of one or more sections of the response content, a fourth visual representation of an intermediate checklist for self-evaluation of the response content before submission of the lesson, a fifth visual representation of a final editing checklist for self-evaluation of the response content before submission of the response content in a final lesson, a sixth visual representation of a feedback space for delivering feedback for the response content submitted in the lesson, wherein each of the first, second, third, fourth, fifth, and sixth visual representations are juxtaposed to each other in the selectable portion when displayed, and wherein the computer program is configured to identify in a schema a foreign key associated with a primary key of a module to be rendered, with the foreign key being identified to access contents of the lesson;

wherein for each lesson of each educational module, the computer program specifies two or more of the visual representations to render, with each visual representation being selectable, wherein selecting a visual representation causes updating of at least one other visual representation of the two or more visual representations or transitioning to another lesson;

maintaining in a hardware storage device state data specifying a state of the computer program by specifying which educational module is currently being rendered and which lesson of that educational module is currently being rendered;

based on a current state of the computer program, identifying a current module data structure and contents of a current lesson, of that current module data structure, to be rendered in the graphical user interface, the rendering being based on one or more primary-foreign key relationships, wherein identifying the current module data structure and the contents of the current lesson of that module data structure comprises:

based on the current lesson of that data structure, identifying, from the data structure, a primary key for the current lesson;

based on the identified primary key, accessing from storage one or more data structures having a foreign key relationship to the identified primary key;

reading, from the accessed one or more data structures, contents of the current lesson; and based on the read content of the current lesson, identifying two or more of the visual representations to render in the selectable portion;

causing rendering on a display device of a graphical user interface for the current lesson, including:

an input portion for receiving the response content;

a selectable portion displaying, based on the response content:

the two or more of the identified visual representations in juxtaposition to each other in the selectable portion.

2. The method of claim 1, wherein the data structure including primary keys can further comprise a vector of primary keys for accessing other data structures representing contents of respective lessons of an educational module and based on the identified vector of primary keys, for each primary key of the vector of primary keys, accessing from storage one or more data structures having a foreign key relationship to the identified primary key.

3. The method of claim 1, wherein rendering the input portion of the graphical user interface comprises rendering:

an instruction portion to contain written and recorded audio instructions for the lesson;

an input editor portion to input and edit inputted text;

a plurality of icons representing one or more members of a control panel, wherein selection of an icon representing a respective member of the control panel enables, for the inputted text within the input editor portion:

choosing a text color and font from a limited number of text color and font options;

undoing the last inputted text;

redoing the last inputted text;

text formatting a portion of the inputted text, wherein text formatting comprises bolding, underlining, italicizing, or applying strikethrough to the inputted text;

aligning a portion of the inputted text; or bulleting and numbering the inputted text.

4. The method of claim 2, wherein receiving an indication of a selection of a particular lesson in a module adds an icon representing a new member to the input portion of a control panel, and wherein selecting the icon representing the new member applies a spell checking method to the inputted text.

5. The method of claim 1, wherein rendering the visual representation of the one or more reference texts comprises, for each reference text, the text of the reference, an audio recording of the text, and figures and diagrams associated with the text, and wherein the text can be annotated with a highlighter of a plurality of colors.

6. The method of claim 1, wherein rendering the visual representation of the writer's notebook comprises rendering:

an input editor portion to input and edit inputted text;

a plurality of buttons representing a writer's notebook control panel for one or more members, wherein selecting an icon representing a respective member of the writer's notebook control panel enables, within the editor input portion:

undoing the last inputted text;

redoing the last inputted text;

text formatting a portion of the inputted text, wherein text formatting comprises bolding, underlining, italicizing, or applying strikethrough to the inputted text;

aligning a portion of the inputted text; and bulleting and numbering the inputted text.

7. The method of claim 1, wherein rendering the visual representation of the graphic organizer comprises rendering a graphical user interface with a plurality of text input portions for inputting text associated with an outline feature in a structured outline for the lesson, the outline feature comprising fields for:

delineating a purpose of the text;

identifying intended readers of the text; and planning topic sentences and support details of paragraphs.

8. The method of claim 1, wherein rendering the visual representation of the checklist for self-reflection before submission of an assignment of the lesson comprises rendering a visual representation of a hierarchical arrangement of a plurality of statements for self-reflection corresponding with a writing structure of the lesson, wherein a self-reflection icon is selectable within the graphical user interface in juxtaposition to a visual representation of a statement to indicate achievement of the statement.

9. The method of claim 8, wherein the hierarchical arrangement of statements for self-evaluation corresponds with a plurality of sections that pertain to an introduction, plurality of body paragraphs, and conclusion sections of the lesson.

10. The method of claim 1, wherein rendering the visual representation of the checklist for self-evaluation before final submission of an assignment of the lesson comprises rendering:
   a visual representation of a list of guidelines that relate to capitalization, punctuation, spelling, grammar, or sentences; and
   one or more self-evaluation icons, wherein each of the one or more icons is selectable, selection of which specifies a self-evaluation for each of a plurality of statements for self-evaluation corresponding with a writing structure of the lesson.

11. The method of claim 1, wherein rendering the visual representation of the feedback space comprises:
   rendering a visual representation of written feedback as a text feedback container;
   rendering recorded audio feedback in an audio feedback container that includes a selectable play button for playing the audio;
   and wherein each container further specifies a label of the corresponding lesson from which the feedback was given.

12. The method of claim 1, wherein the selectable portion for displaying visual representations further comprises a writer's library for displaying an output of finished lessons in the final lesson of the module; and wherein rendering a visual representation of the writer's library comprises:
   rendering one or more visual representations of shelves that contain a plurality of completed lesson work.

13. The method of claim 1, further comprising executing the computer program for causing rendering of a graphical user interface including a visual representation of the lesson of an educational module on the display of a user; and wherein the two or more of the identified visual representations of the selectable portion are visual representations for the lesson relevant to stage of drafting the sub-goal of the lesson, wherein the stages of drafting comprise:
   a planning stage;
   a drafting stage;
   a plurality of revision stages; and
   a final editing stage.

14. A system comprising one or more computers and one or more storage devices storing instructions that are operable, when executed by the one or more computers to cause the one or more computers to perform operations comprising:
   reading, from a hardware storage device, a plurality of data structures representing educational modules, with each data structure including primary keys for accessing other data structures representing lessons of an educational module pertaining to a writing assignment, with an educational module being associated with a particular learning goal and with a lesson being associated with a sub-goal for the writing assignment;
   reading, from a hardware storage device, ordering data specifying an order in which the educational modules are rendered and an order in which lessons are rendered for each educational module;
   based on the plurality of data structures and the ordering data, generating a computer program for causing rendering of a graphical user interface including a visual representation of a lesson of an educational module as:
      an input portion for receiving response content comprising input text associated with the writing assignment;
      a selectable portion for displaying, based on the response content:
         a first visual representation of a writer's notebook for note taking and planning of the response content,
         a second visual representation specifying one or more reference texts when applicable to the lesson,
         a third visual representation of a graphic organizer for structural organization of one or more sections of the response content,
         a fourth visual representation of an intermediate checklist for self-evaluation of the response content before submission of the lesson,
         a fifth visual representation of a final editing checklist for self-evaluation of the response content before submission of the response content in a final lesson,
         a sixth visual representation of a feedback space for delivering feedback for the response content submitted in the lesson,
      wherein each of the first, second, third, fourth, fifth, and sixth visual representations are juxtaposed to each other in the selectable portion when displayed, and wherein the computer program is configured to identify in a schema a foreign key associated with a primary key of a module to be rendered, with the foreign key being identified to access contents of the lesson;
   wherein for each lesson of each educational module, the computer program specifies two or more of the visual representations to render, with each visual representation being selectable, wherein selecting a visual representation causes updating of at least one other visual representation of the two or more visual representations or transitioning to another lesson;
   maintaining in a hardware storage device state data specifying a state of the computer program by specifying which educational module is currently being rendered and which lesson of that educational module is currently being rendered;
   based on a current state of the computer program, identifying a current module data structure and contents of a current lesson, of that current module data structure, to be rendered in the graphical user interface, the rendering being based on one or more primary-foreign key relationships, wherein identifying the current module data structure and the contents of the current lesson of that module data structure comprises:
      based on the current lesson of that data structure, identifying, from the data structure, a primary key for the current lesson;
      based on the identified primary key, accessing from storage one or more data structures having a foreign key relationship to the identified primary key;
      reading, from the accessed one or more data structures, contents of the current lesson; and
      based on the read content of the current lesson, identifying two or more of the visual representations to render in the selectable portion;
   causing rendering on a display device of a graphical user interface for the current lesson, including:
   an input portion for receiving the response content;
   a selectable portion displaying, based on the response content:

the two or more of the identified visual representations in juxtaposition to each other in the selectable portion.

15. The system of claim 14, wherein the data structure including primary keys can further comprise a vector of primary keys for accessing other data structures representing contents of respective lessons of an educational module and based on the identified vector of primary keys, for each primary key of the vector of primary keys, accessing from storage one or more data structures having a foreign key relationship to the identified primary key.

16. The system of claim 14, wherein rendering the input portion of the graphical user interface comprises rendering:
 an instruction portion to contain written and recorded audio instructions for the lesson;
 an input editor portion to input and edit inputted text;
 a plurality of icons representing one or more members of a control panel, wherein selection of an icon representing a respective member of the control panel enables, for the inputted text within the input editor portion:
  choosing a text color and font from a limited number of text color and font options;
  undoing the last inputted text;
  redoing the last inputted text;
  text formatting a portion of the inputted text, wherein text formatting comprises bolding, underlining, italicizing, or applying strikethrough to the inputted text;
  aligning a portion of the inputted text; or
  bulleting and numbering the inputted text.

17. The system of claim 14, further comprising executing the computer program for causing rendering of a graphical user interface including a visual representation of the lesson of an educational module on the display of a user; and wherein the two or more of the identified visual representations of the selectable portion are visual representations for the lesson relevant to stage of drafting the sub-goal of the lesson, wherein the stages of drafting comprise:
 a planning stage;
 a drafting stage;
 a plurality of revision stages; and
 a final editing stage.

18. One or more non-transitory computer-readable media storing instructions that are operable, when executed by a data processing apparatus, to cause the data processing apparatus to perform operations comprising:
 reading, from a hardware storage device, a plurality of data structures representing educational modules, with each data structure including primary keys for accessing other data structures representing lessons of an educational module pertaining to a writing assignment, with an educational module being associated with a particular learning goal and with a lesson being associated with a sub-goal for the writing assignment;
 reading, from a hardware storage device, ordering data specifying an order in which the educational modules are rendered and an order in which lessons are rendered for each educational module;
 based on the plurality of data structures and the ordering data, generating a computer program for causing rendering of a graphical user interface including a visual representation of a lesson of an educational module as:
  an input portion for receiving response content comprising input text associated with the writing assignment;
  a selectable portion for displaying, based on the response content:
   a first visual representation of a writer's notebook for note taking and planning of the response content,
   a second visual representation specifying one or more reference texts when applicable to the lesson,
   a third visual representation of a graphic organizer for structural organization of one or more sections of the response content,
   a fourth visual representation of an intermediate checklist for self-evaluation of the response content before submission of the lesson,
   a fifth visual representation of a final editing checklist for self-evaluation of the response content before submission of the response content in a final lesson,
   a sixth visual representation of a feedback space for delivering feedback for the response content submitted in the lesson,
  wherein each of the first, second, third, fourth, fifth, and sixth visual representations are juxtaposed to each other in the selectable portion when displayed, and wherein the computer program is configured to identify in a schema a foreign key associated with a primary key of a module to be rendered, with the foreign key being identified to access contents of the lesson;
 wherein for each lesson of each educational module, the computer program specifies two or more of the visual representations to render, with each visual representation being selectable, wherein selecting a visual representation causes updating of at least one other visual representation of the two or more visual representations or transitioning to another lesson;
 maintaining in a hardware storage device state data specifying a state of the computer program by specifying which educational module is currently being rendered and which lesson of that educational module is currently being rendered;
 based on a current state of the computer program, identifying a current module data structure and contents of a current lesson, of that current module data structure, to be rendered in the graphical user interface, the rendering being based on one or more primary-foreign key relationships, wherein identifying the current module data structure and the contents of the current lesson of that module data structure comprises:
  based on the current lesson of that data structure, identifying, from the data structure, a primary key for the current lesson;
  based on the identified primary key, accessing from storage one or more data structures having a foreign key relationship to the identified primary key;
  reading, from the accessed one or more data structures, contents of the current lesson; and
  based on the read content of the current lesson, identifying two or more of the visual representations to render in the selectable portion;
 causing rendering on a display device of a graphical user interface for the current lesson, including:
 an input portion for receiving the response content;
 a selectable portion displaying, based on the response content:
  the two or more of the identified visual representations in juxtaposition to each other in the selectable portion.

19. The one or more non-transitory computer-readable media of claim 18, wherein the data structure including primary keys can further comprise a vector of primary keys for accessing other data structures representing contents of respective lessons of an educational module and based on the identified vector of primary keys, for each primary key of the vector of primary keys, accessing from storage one or more data structures having a foreign key relationship to the identified primary key.

20. The one or more non-transitory computer-readable media of claim 18, further comprising executing the computer program for causing rendering of a graphical user interface including a visual representation of the lesson of an educational module on the display of a user; and wherein the two or more of the identified visual representations of the selectable portion are visual representations for the lesson relevant to stage of drafting the sub-goal of the lesson, wherein the stages of drafting comprise:

a planning stage;
a drafting stage;
a plurality of revision stages; and
a final editing stage.

* * * * *